(12) United States Patent
Kuiper et al.

(10) Patent No.: US 9,949,458 B2
(45) Date of Patent: Apr. 24, 2018

(54) ANIMAL WASTE DISPOSAL SYSTEM

(71) Applicant: Grotown VI, LLC, Grand Rapids, MI (US)

(72) Inventors: William J. Kuiper, Hudsonville, MI (US); Stephen J. Timyan, Grand Rapids, MI (US)

(73) Assignee: Grotown VI, LLC, Grand Rapids, MI (US)

( * ) Notice: Subject to any disclaimer, the term of this patent is extended or adjusted under 35 U.S.C. 154(b) by 227 days.

(21) Appl. No.: 14/692,899

(22) Filed: Apr. 22, 2015

(65) Prior Publication Data

US 2015/0334983 A1 Nov. 26, 2015

Related U.S. Application Data

(63) Continuation of application No. 29/491,358, filed on May 20, 2014, now Pat. No. Des. 731,716.

(60) Provisional application No. 62/000,807, filed on May 20, 2014.

(51) Int. Cl.
*A01K 1/01* (2006.01)

(52) U.S. Cl.
CPC .................. *A01K 1/0114* (2013.01)

(58) Field of Classification Search
CPC .... A01K 1/0114; A01K 1/011; A01K 1/0107; A01K 1/0125
See application file for complete search history.

(56) References Cited

U.S. PATENT DOCUMENTS

| X529053 | | 11/1894 | Wilcox |
|---|---|---|---|
| 3,613,943 | A | 10/1971 | Bridenstine |
| 3,684,155 | A | 8/1972 | Smith |
| 3,757,990 | A | 9/1973 | Buth |
| 3,771,493 | A | 11/1973 | Chandor |
| 3,809,013 | A | 5/1974 | Rigney et al. |
| 3,831,557 | A | 8/1974 | Elesh |
| 3,990,396 | A * | 11/1976 | Turk .................... A01K 1/0107 119/170 |
| 4,217,857 | A | 8/1980 | Geddie |
| 4,279,217 | A * | 7/1981 | Behringer ............ A01K 1/0107 119/170 |
| 4,305,544 | A | 12/1981 | Noonan |
| 4,308,825 | A | 1/1982 | Stepanian |
| 4,312,295 | A | 1/1982 | Harrington |

(Continued)

*Primary Examiner* — Kathleen I Alker
(74) *Attorney, Agent, or Firm* — Warner Norcross & Judd LLP

(57) ABSTRACT

A waste disposal apparatus having outwardly-canted sidewalls and a base wall forming a basin. A liner is centrally disposed on an interior of the basin. At least one litter sieve is centrally arranged on the liner. A securing flange is located on a top portion of the sidewalls and is operable between a closed position and an open position and includes at least one handle protrusion. The litter sieves and the liner are held securely in place by the securing flange when the securing flange is in the closed position. A litter sieve can include opposing handle ribbons removably disposed in corresponding envelopes on opposite sides of the sieve. The envelopes can include frangible elements that selectively secure the handle ribbons, but that fail upon application of a force so that the ribbons can at least partially exit the envelopes and thereafter used to lift a loaded sieve.

20 Claims, 19 Drawing Sheets

(56) References Cited

U.S. PATENT DOCUMENTS

| | | | |
|---|---|---|---|
| 4,469,046 A * | 9/1984 | Yananton | A01K 1/0107 119/169 |
| 4,501,226 A * | 2/1985 | Bienvenu | A01K 1/0125 119/168 |
| 4,548,160 A | 10/1985 | Feitelson | |
| 4,615,300 A | 10/1986 | McDonough | |
| 4,646,684 A * | 3/1987 | Embry | A01K 1/0107 119/167 |
| 4,648,349 A | 3/1987 | Larson | |
| 4,723,510 A | 2/1988 | Skillestad | |
| 4,739,725 A | 4/1988 | Fennelly | |
| 4,784,082 A | 11/1988 | Wolfe | |
| 4,813,374 A | 3/1989 | Sides | |
| 4,846,105 A | 7/1989 | Caldwell | |
| 4,869,204 A | 9/1989 | Yananton | |
| 4,870,924 A | 10/1989 | Wolfe | |
| 4,934,316 A | 6/1990 | Mack | |
| 4,967,692 A | 11/1990 | Mills | |
| 5,038,721 A | 8/1991 | Ouellette et al. | |
| 5,062,392 A | 11/1991 | Lavash | |
| 5,078,099 A | 1/1992 | Balson | |
| 5,115,766 A | 5/1992 | Williams | |
| 5,121,712 A | 6/1992 | Schulein, Jr. et al. | |
| 5,158,042 A | 10/1992 | Hammerslag et al. | |
| 5,207,772 A | 5/1993 | Lauretta et al. | |
| 5,325,815 A | 7/1994 | Gumpesberger | |
| 5,410,987 A | 5/1995 | Simmons | |
| 5,488,929 A | 2/1996 | Pierson et al. | |
| 5,499,610 A | 3/1996 | Bruner et al. | |
| 5,507,248 A | 4/1996 | Gabber | |
| 5,551,376 A | 9/1996 | Lundeen et al. | |
| 5,555,844 A | 9/1996 | Kolomeyer | |
| 5,598,811 A | 2/1997 | Merchant | |
| D378,451 S | 3/1997 | Schmidt | |
| 5,636,594 A | 6/1997 | Pina | |
| 5,752,466 A | 5/1998 | Lundeen et al. | |
| 5,755,181 A | 5/1998 | Petkovski | |
| 5,785,001 A | 7/1998 | Robinson | |
| 5,791,289 A * | 8/1998 | Savicki | A01K 1/0107 119/165 |
| 5,794,566 A * | 8/1998 | Goetz | A01K 1/0107 119/161 |
| 5,799,610 A | 9/1998 | Poulos | |
| 5,832,869 A | 11/1998 | Franczak et al. | |
| D408,949 S | 4/1999 | Queen | |
| 5,890,452 A | 4/1999 | Lundeen et al. | |
| 5,983,832 A | 11/1999 | Seo | |
| D426,684 S | 6/2000 | Kenney | |
| 6,135,058 A * | 10/2000 | Jaeger | A01K 1/0114 119/167 |
| 6,267,078 B1 | 7/2001 | Pina | |
| 6,595,159 B1 | 7/2003 | Montalbano | |
| 6,668,755 B1 | 12/2003 | Koster | |
| D488,890 S | 4/2004 | Radde | |
| 6,824,114 B1 * | 11/2004 | VanSkiver | A01K 1/0114 248/220.21 |
| 6,837,179 B2 | 1/2005 | Sannikka | |
| D526,748 S | 8/2006 | Van Skiver | |
| 7,255,261 B2 | 8/2007 | Mesly | |
| 7,380,519 B2 * | 6/2008 | Ikegami | A01K 1/0107 119/161 |
| 8,074,603 B2 | 12/2011 | Ohlman et al. | |
| 8,220,622 B1 * | 7/2012 | Lewis | A01K 1/0107 119/168 |
| 2007/0215058 A1 | 9/2007 | Spreitzer | |
| 2007/0215059 A1 | 9/2007 | Sefranek | |
| 2008/0041316 A1 | 2/2008 | Hartzell | |
| 2009/0194033 A1 | 8/2009 | Modlin | |
| 2009/0304307 A1 | 12/2009 | Diep et al. | |
| 2010/0012043 A1 | 1/2010 | Wenzel | |
| 2013/0152863 A1 * | 6/2013 | Peterson | A01K 1/0125 119/168 |
| 2013/0327278 A1 * | 12/2013 | Reichert | A01K 1/0114 119/167 |
| 2014/0283753 A1 | 9/2014 | Dawn et al. | |

* cited by examiner

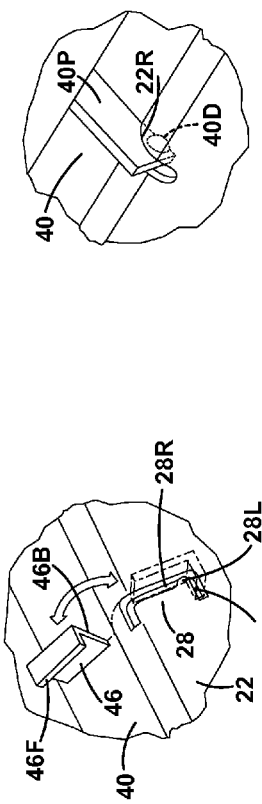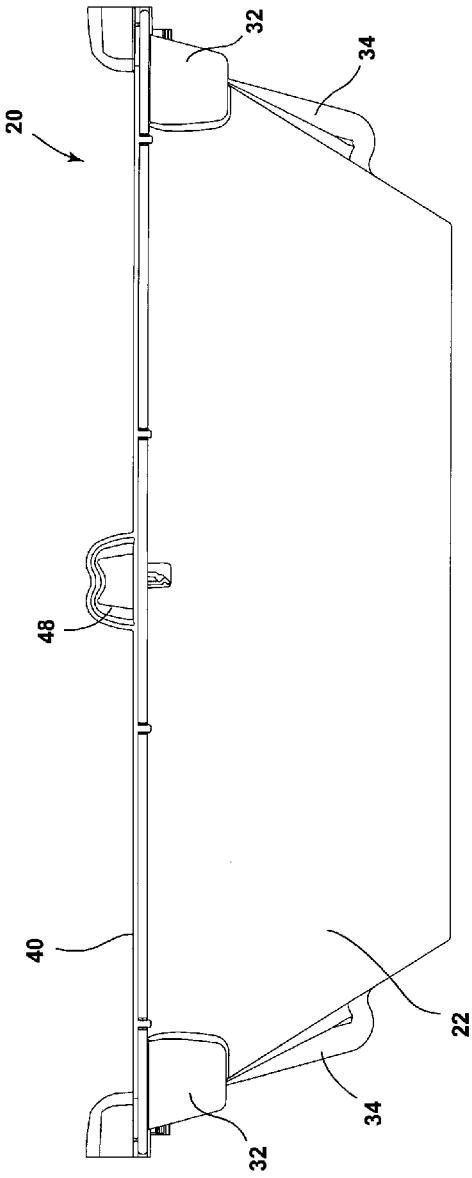

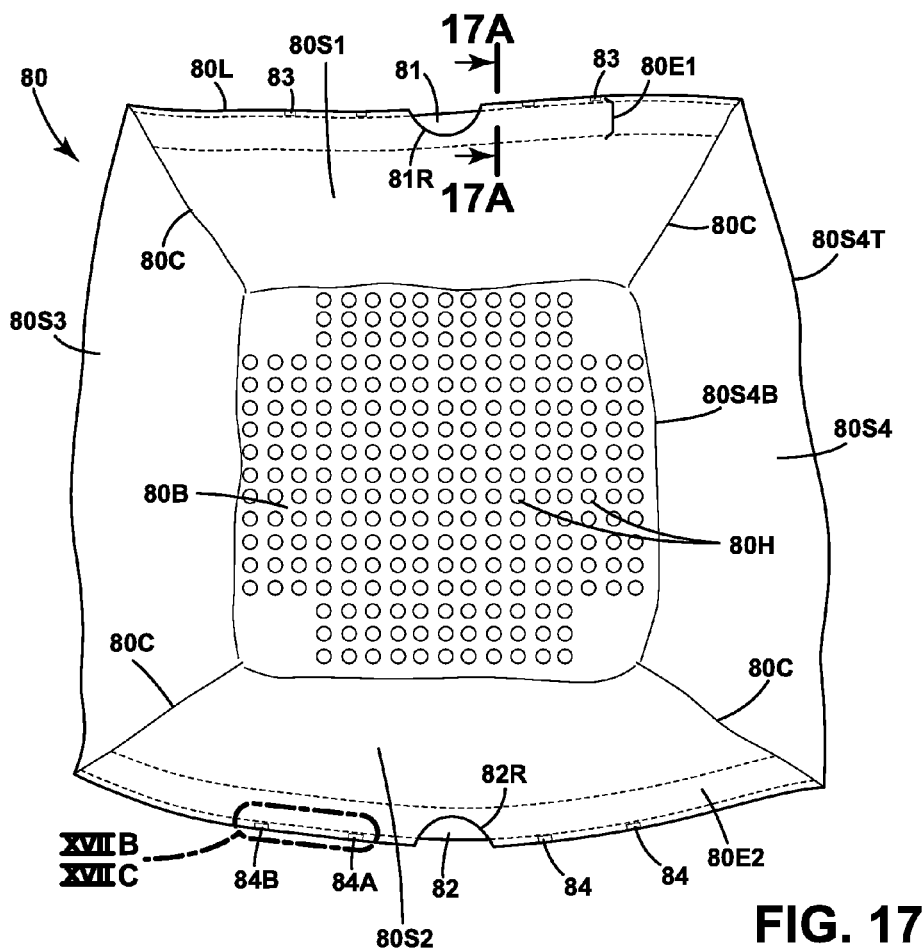
FIG. 17
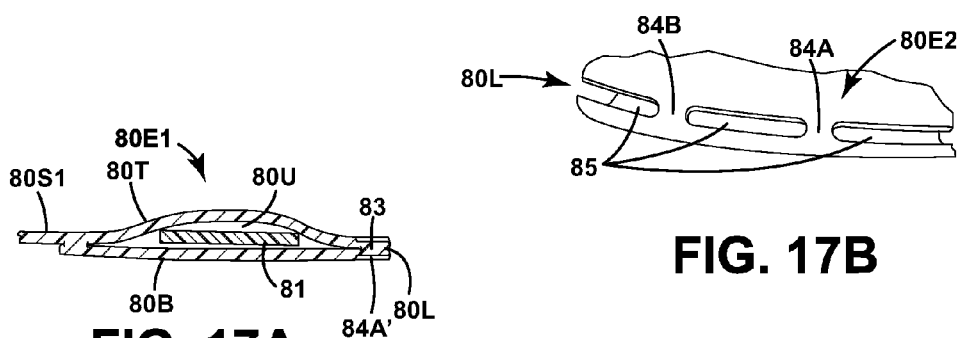
FIG. 17A
FIG. 17B
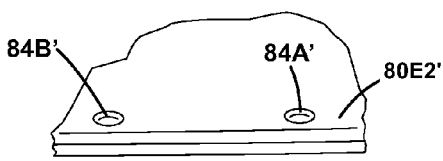
FIG. 17C

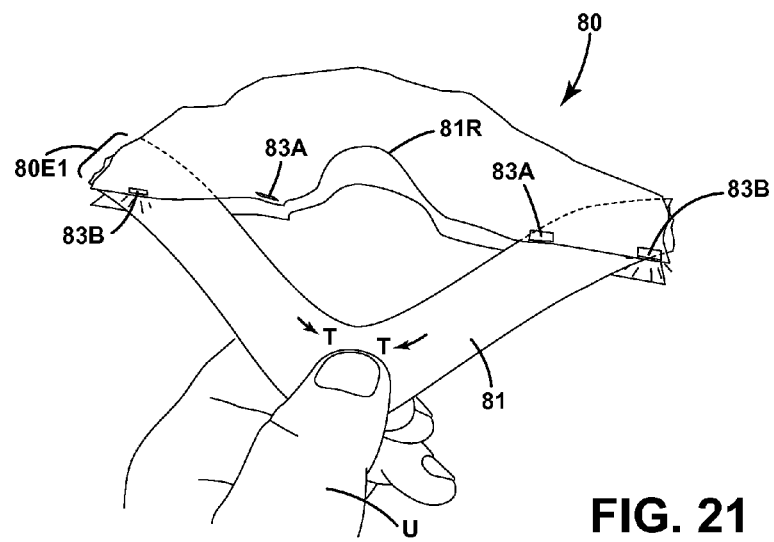
FIG. 21
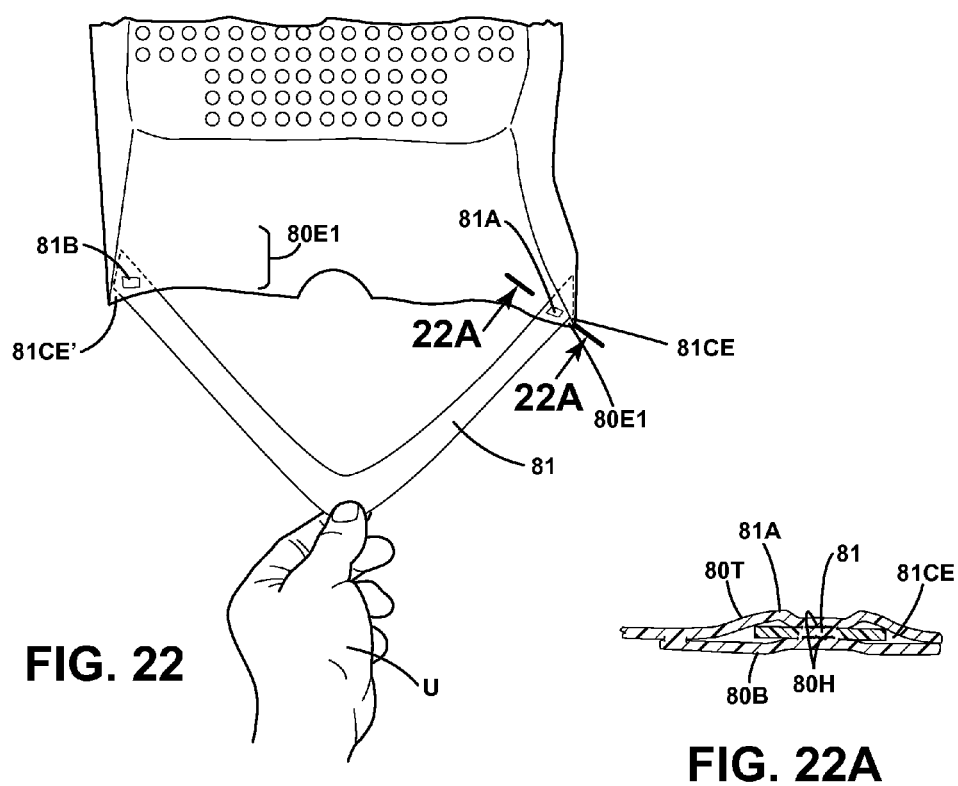
FIG. 22
FIG. 22A

ANIMAL WASTE DISPOSAL SYSTEM

BACKGROUND OF THE INVENTION

The present invention generally relates to an animal waste disposal system and a method for constructing the same.

Conventional animal waste disposal systems are often difficult to handle for a user and messy during the waste removal process. This can lead to unwanted odors, extra time and resources to clean the systems, and in some cases, unhygienic conditions on or around the disposal systems.

SUMMARY OF THE INVENTION

In one embodiment, a waste disposal apparatus is provided, including multiple outwardly-canted sidewalls and a base wall forming a basin. A liner can be centrally disposed in an interior of the basin. One or more litter sieves can be centrally arranged on the liner.

In another embodiment, at least one securing flange can be located on a top portion of the sidewalls. The securing flange can be operable between a closed position and an open position and can include at least one handle protrusion. The sidewalls can include at least one handle protrusion. The litter sieves and the liner can be held securely in place by the at least one securing flange when the at least one securing flange is in the closed position.

In still another embodiment, the securing flange can include a flexible, resilient and/or moveable engagement flange that is configured to engage the litter sieves and/or liner. The engagement flange can flex or move when the number or thickness of sieves between it and the sidewalls is substantial. However, when the number or thickness of the sieves between it and the sidewalls is insubstantial, the engagement flange still can hold the sieves and/or liner in place, optionally without flexing or moving much or at all.

In yet another embodiment, the securing flange and/or sidewalls can include a lock to hold the securing flange, and optionally the engagement flange, in locked engagement with the sieves and/or liner. This, in turn, can hold the sieves and liner in a desired configuration in the basin. The lock can be disengaged by a user engaging the handle protrusions and applying a force sufficient to overcome the lock. Upon this action, the securing flange moves, optionally rotating, to the open position to provide access to the sieves and/or liner.

In even another embodiment, the litter sieves can include multiple pass-through holes generally arranged in a plus sign configuration. The pass through holes can be formed as cutouts or open voids in a base of the sieves, optionally in the form of circular or other rounded apertures to facilitate rapid evacuation of litter from the sieves upon removal from the basin.

In even yet another embodiment, the litter sieves and liner can include first and second handles positioned on opposing sides of each of the same. The handles can be in the form of slits in the bases of the sieves and/or liners disposed inwardly from an outer lateral edge of the base. A user can project their hand through the slits to access and grasp the handles. Using the handles the user can lift the sieve and/or liner from the basin. The handles can be strong enough so that they do not tear upon the lifting of the sieve and/or liner, even with litter or waste located in the sieve and/or liner.

In a further embodiment, the litter sieves and liner can include first and second handles positioned on opposing sides of each of the same. The handles can be in the form of elongate strips, and can be temporarily enclosed in corresponding first and second envelopes on opposing sides of the same.

In still a further embodiment, the envelopes can be frangible or destructible so that they can open and allow the strips to exit or otherwise move at least partially out from the envelopes upon application of a predetermined force to the strips. With this construction, the strips remain out of the way and do not readily tangle, for stacking, piling and/or handling of the litter sieves and liner, before installation in the basin. However, when a user desires to use the handles, the user can engage a portion of the strips, pull on them, and move the strips at least partially out of the envelopes easily to facilitate conversion of the sieves and/or liner from a generally open configuration to a smaller "parachute" configuration conducive to lifting and dumping excess litter in the sieves back into the basin, atop the next remaining sieve and/or liner.

In even another embodiment, the litter sieves and/or liner can include the above strips disposed in the envelopes. The envelopes can be closed along a portion of the same, generally above the strips, with a frangible element that breaks, tears or releases upon the application of about 0.5 pounds to about 15 pounds, optionally between 2 pounds and 5 pounds, so as to enable the strips to pull free from at least a portion of the envelope. The frangible element can be in the form of tacked or hot welded spots, or in the form of perforations, or small, weak portions of the envelope that temporarily connect front and rear or other panels of the envelope.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

BRIEF DESCRIPTION OF THE DRAWINGS

FIG. 3A is a close-up of a lock of a securing flange of the basin;

FIG. 3B is a close-up of a hinge of a securing flange;

FIG. 4 is a side plan view of the basin;

FIG. 17 is a top view of an alternative sieve for use with the litter disposal system;

FIG. 17A is a section view of an envelope of the alternative sieve, taken along lines 17A-17A of FIG. 17;

FIG. 17B is a close up of a first frangible element of an envelope of the alternative sieve, taken from area 17B, 17C of FIG. 17;

FIG. 17C is a close up of a second frangible element of an envelope of the alternative sieve, taken from area 17B, 17C of FIG. 17;

FIG. 21 is a close up view of the handle ribbon as second frangible elements of the sieve are being stressed to failure and breaking to release additional portions of the handle ribbon from the envelope under the force of pull by the user;

FIG. 22 is a close up view of the handle ribbon after all the second frangible elements of the sieve are broken, with the handle ribbon pulling up and raising the sieve;

FIG. 22A is a section view of an end of the envelope where the handle ribbon is anchored, taken along lines 22A-22A of FIG. 22.

DETAILED DESCRIPTION OF CURRENT EMBODIMENTS

Figure 1:
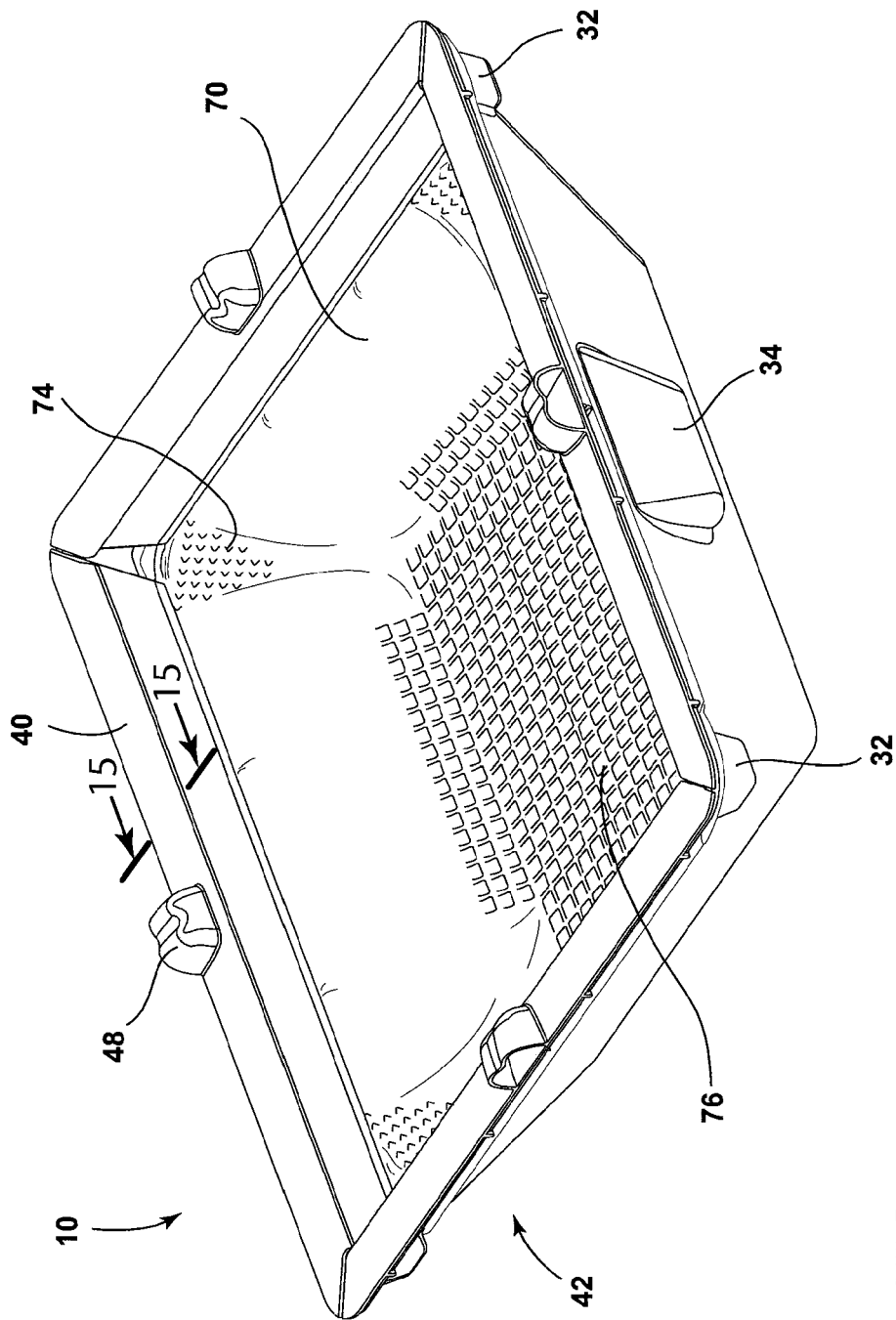
FIG. 1 is a top perspective view of the waste disposal apparatus of a current embodiment.
Figure 2:
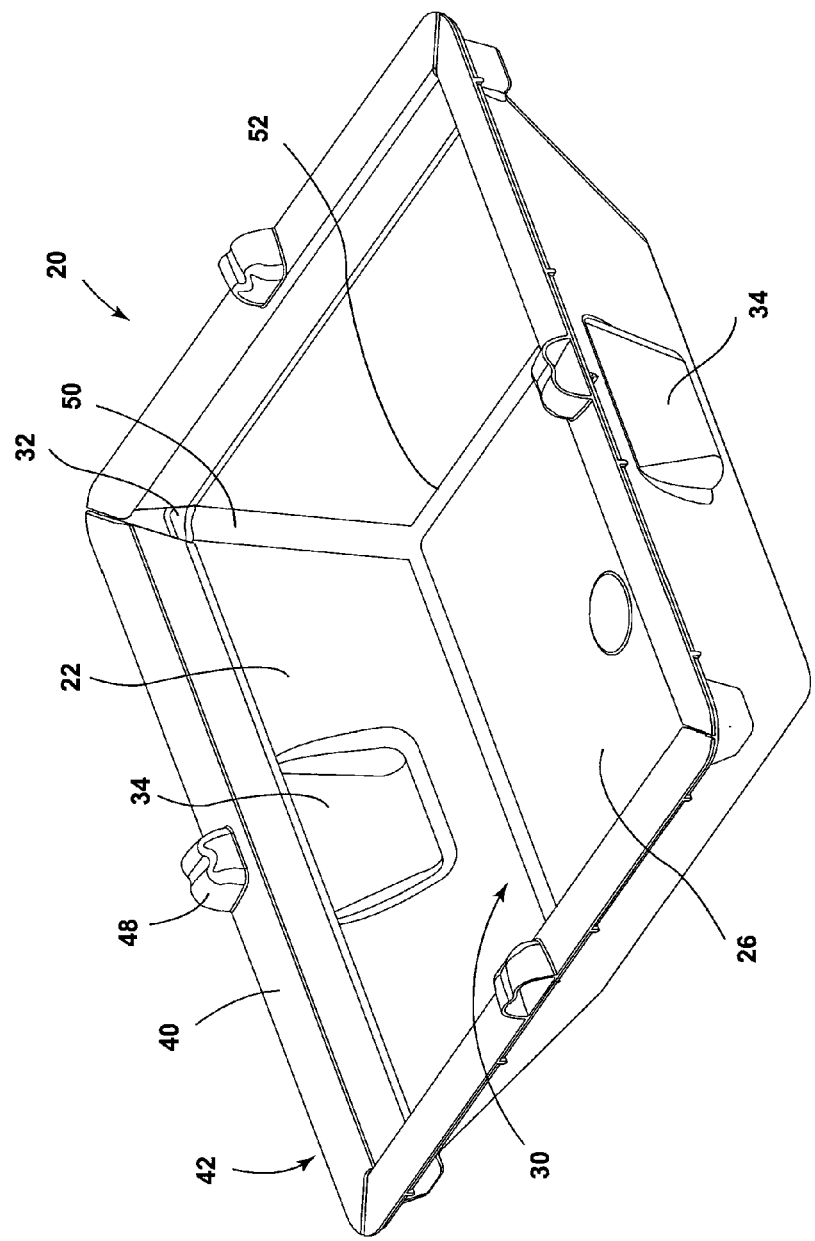
FIG. 2 is a top perspective view of the basin of the current embodiment.
Figure 13:
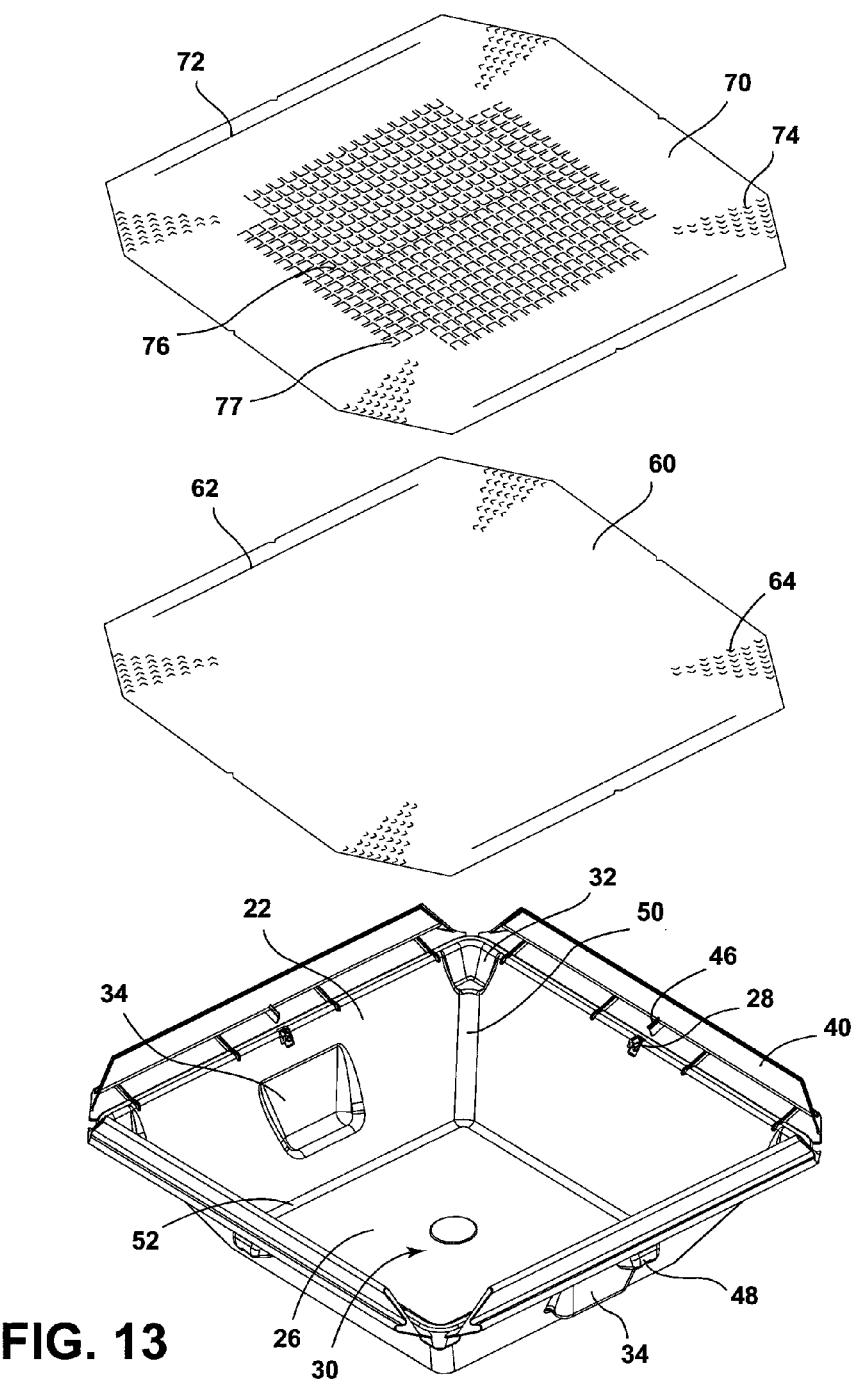
FIG. 13 is an exploded top perspective view of the waste disposal apparatus.

As shown in the embodiment illustrated in FIG. 1, reference number 10 generally designates a waste disposal apparatus. The waste disposal apparatus 10 generally includes outwardly canted sidewalls 22 and a base wall 26 forming a basin 20. As shown in FIG. 13, at least one liner 60 is disposed on the interior 30 of the basin 20, and a plurality of litter sieves 70 centrally arranged on the liner 60. The basin 20 is generally comprised of a plastic polymer material. The basin 20 also includes at least one handle protrusion 34 centrally located on at least one sidewall 22. A top portion 24 of the sidewall 22 includes a securing flange 40. The securing flange 40 is operable between an open position 44 (FIG. 3) and a closed position 42 (FIGS. 1 and 2). The securing flange 40 further includes a finger tab 48 configured to assist a user in moving the securing flange 40 from the open position 44 to the closed position 42 and from the closed position 42 to the open position 44.

FIG. 1 further shows the at least one liner 60 centrally disposed in the interior 30 of the basin 20. The plurality of litter sieves 70, are generally centrally arranged on the liner 60 and both the liner 60 and sieves 70 are secured in place by the securing flanges 40 when the securing flanges 40 are in the closed position 42. After the litter sieves 70 are secured in place, a user can insert litter into the interior 30 of the basin 20. Typically, up to ten sieves 70 are disposed on the liner 60. However, it is contemplated that more or less sieves 70 may be positioned on the liner 60. For example, 5-10 sieves and a single liner can be packaged and used together as a unit, installed in the basing, with individual sieves removed at intervals to remove animal waste deposited in the basin. Generally, as used herein, a removal element can refer to a liner and/or a sieve.

FIG. 2 shows the basin 20 having the liner 60 and litter sieve 70 removed. The basin 20 can include reinforced corners 50 of the sidewalls 22 and a reinforced area 52 surrounding the base wall 26 in order to provide additional structural support for the waste disposal apparatus 10. The basin 20 further has outwardly canted sidewalls 22 which are canted to provide an animal enough space to defecate or urinate, and to prevent the animal from removing litter from the basin 20 before, during or after the act of urination or defecation. The handle protrusions 34 are centrally disposed on at least one sidewall 22 of the basin 20, and on opposite sidewalls 22, to allow a user to easily pick up and move the entire apparatus 10. The handles 34 are configured to receive at least three to four fingers of a user and designed so that the underside of the handle 34, where the user will engage the handle with their fingers, remains clean and free of litter and other debris, such that the user can maintain clean hands.

Optionally, although the handles are shown as protrusions projecting outward from the base, they alternatively can be recessed into the interior of the basin. As an example, the handles can be recesses defined in the outer surfaces of the sidewalls. Of course, the handles in such a construction can be reflected into the interior of the basin, in which case they would project inwardly into the interior of the basin.

The illustrated basin 20 includes recessed top corners 32 as generally illustrated in FIGS. 4-7. The recessed corners 32 are designed such that during the stacking of a plurality of basins 20 during the manufacturing and shipment processes, the bottom of one basin 20 engages the recessed corners 32 of another basin 20 in order to provide secure stacking of the apparatuses 10 without damage to any feature of the apparatus 10. Additionally, the handles 34 define a recess on the interior 30 of the basin 20. The recess is configured to receive a handle protrusion 34 of a second basin 20 during the stacking process for manufacturing and shipment purposes. The handles of stacked adjacent basins can interfit within one another to enable the basins to efficiently nest in the stacked configuration. This can result in supplies of multiple basins taking up less space, and generally being easier to handle and ship.

Figure 3:
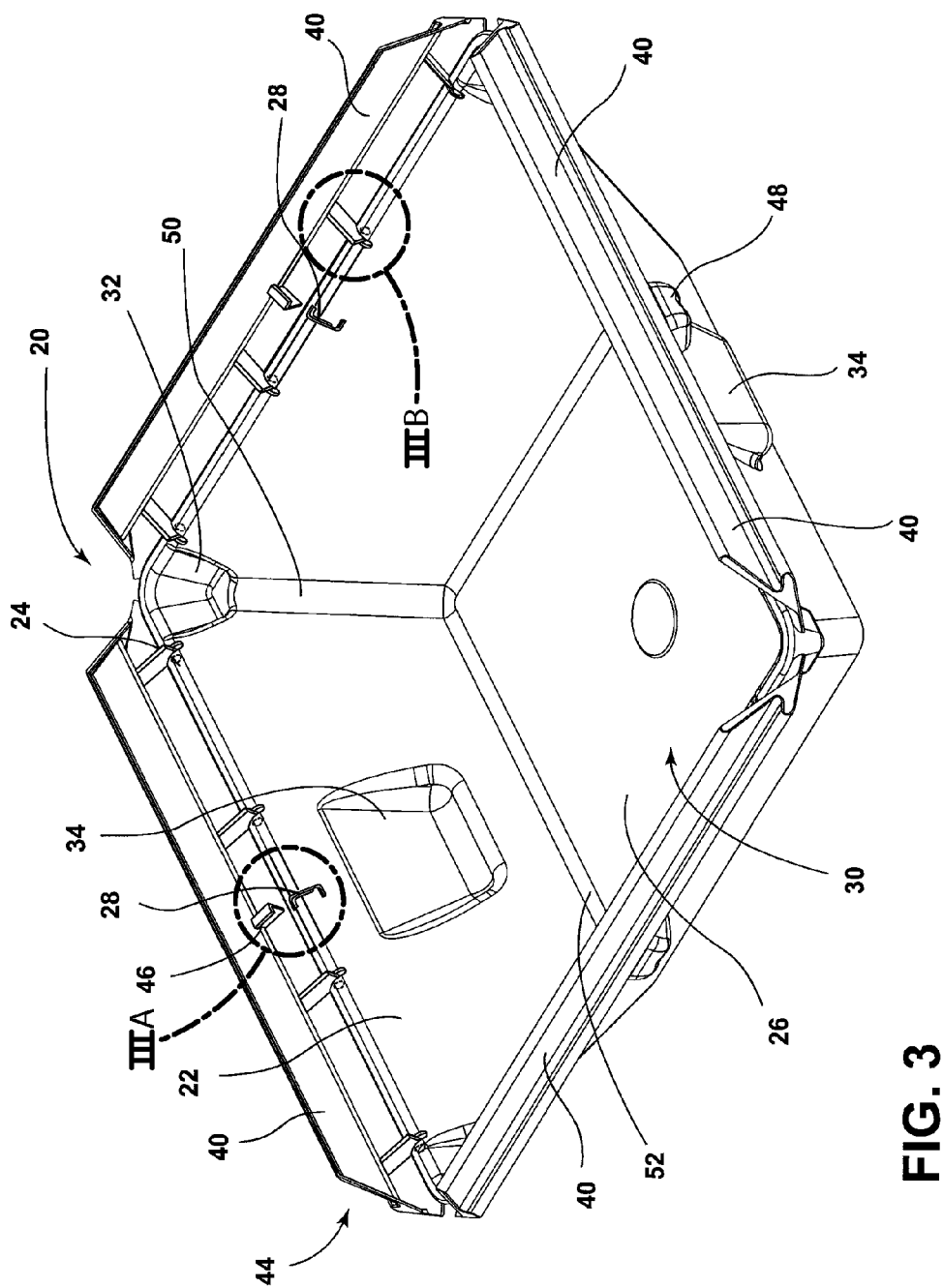
FIG. 3 is a top perspective view of the basin.
Figure 5:
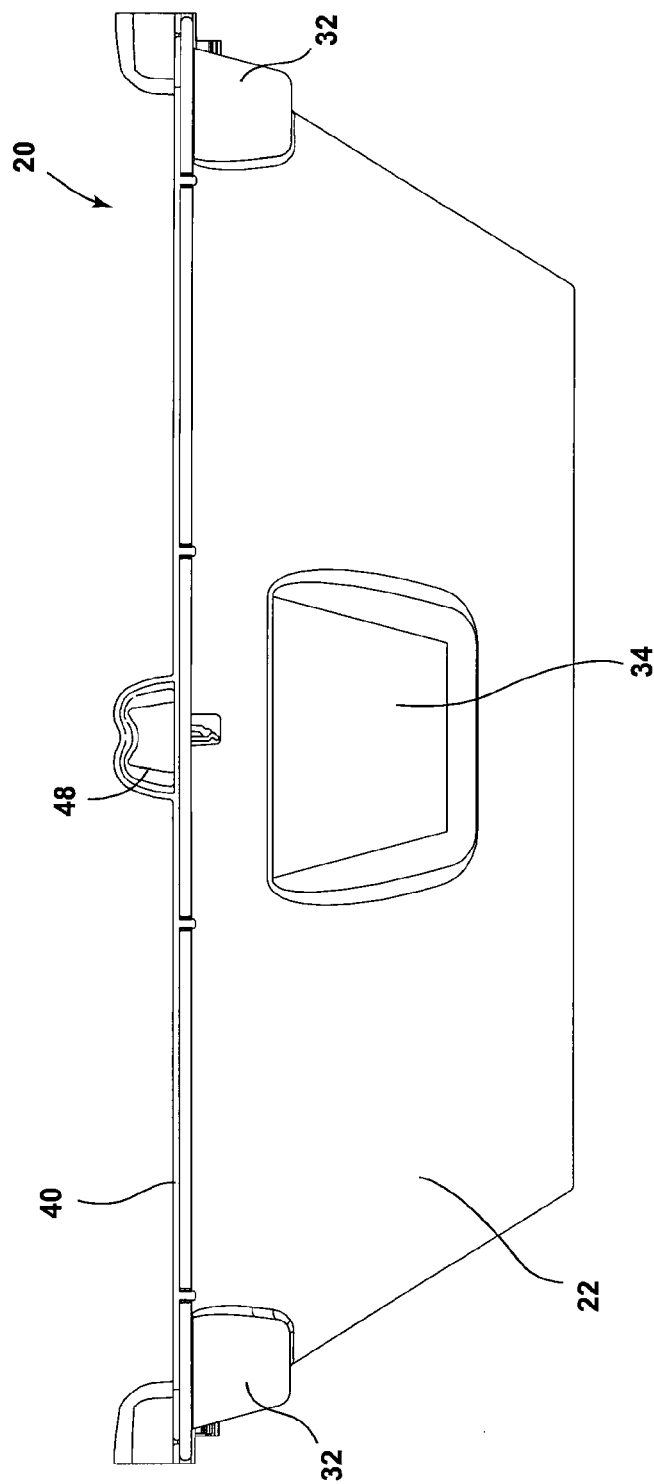
FIG. 5 is another side plan view of the basin.
Figure 6:
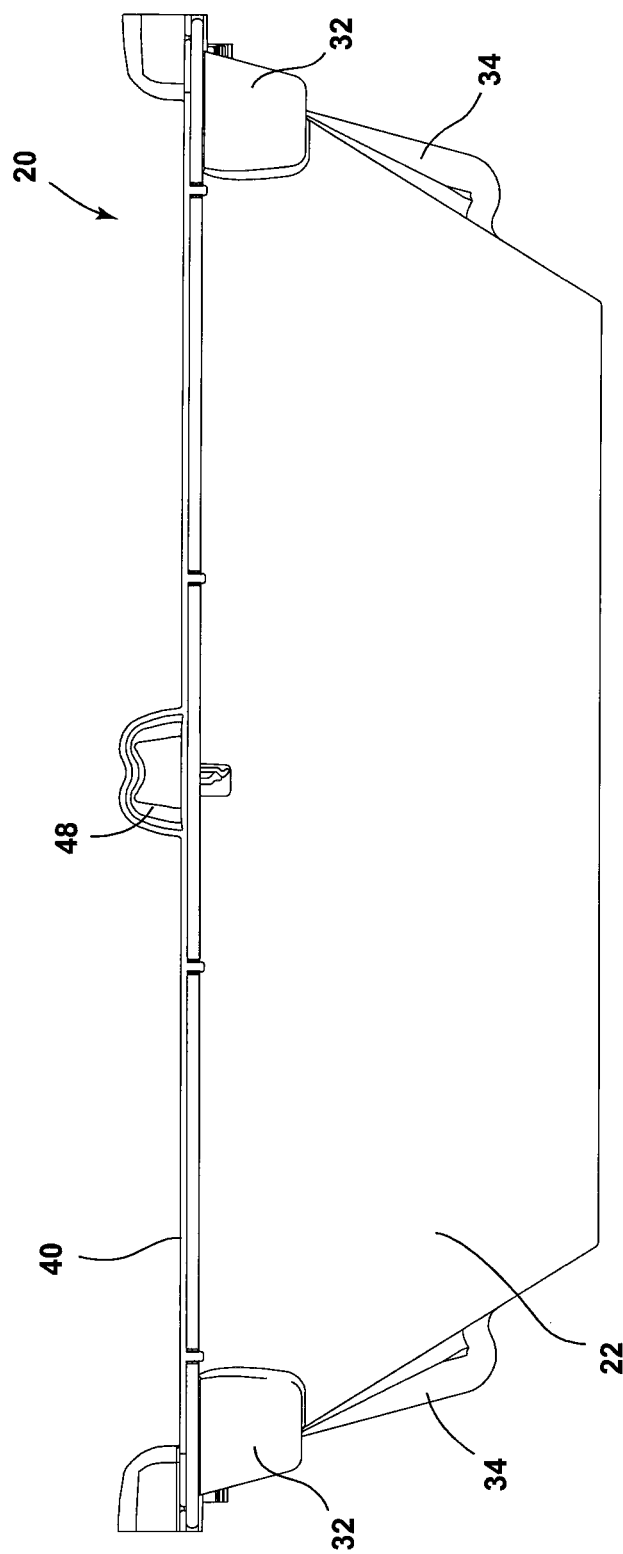
FIG. 6 is yet another side plan view of the basin.
Figure 7:
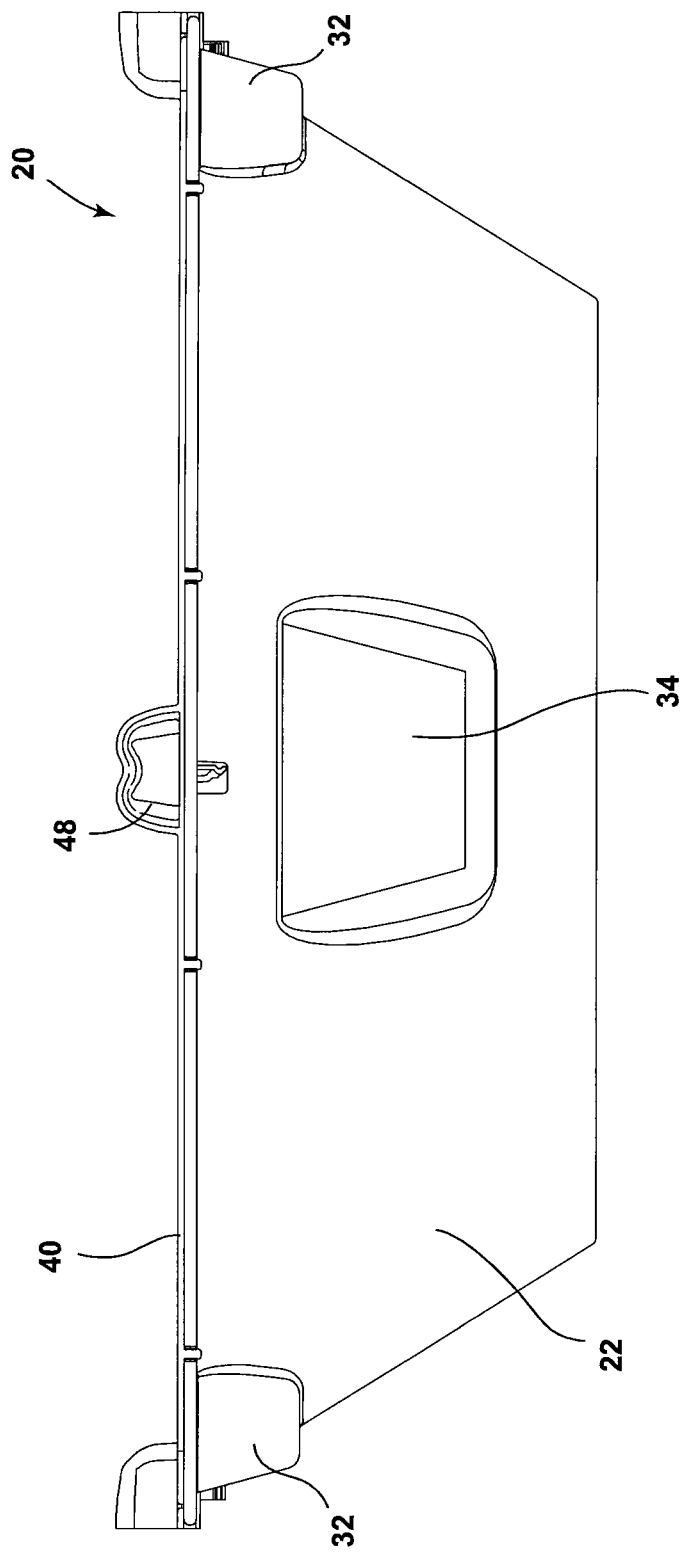
FIG. 7 is another side plan view of the basin.

FIGS. 2 and 3 show the securing flanges 40 in the closed position 42 and in the open position 44, respectively. The securing flanges 40 are connected via a hinge and are configured to rotate open approximately 180°. The hinge may be a living hinge, piano hinge, etc. The flange 40 can optionally be integrally formed with the basin 20 and can have a folded portion configured to engage a top portion of the sidewall 22.

In another construction, shown in FIG. 3B, the flanges 40 can include a pivot plate 40P that is moveably and rotationally disposed in a recess 22R defined by an upper portion of the sidewall 22. The sidewall and/or flange can include a detent 40D or other snap like configuration to rotatably and removably couple the pivot plate to the sidewall. Optionally, the pivot plate 40P can be disengaged from the recess 22R upon application of sufficient force. In this manner, the securing flange can be removed from the basin sidewalls and cleaned or replaced. After cleaning, or in the course of replacement, the pivot plate 40P can be reinstalled in the recess 22R to hingedly couple the flange to the sidewall.

The flanges 40 can be configured to cover an entire perimeter of the basin 20. The finger tab 48 of the securing flange 40 is configured to receive one, two or more fingers of a user to assist the user in moving the securing flange 40 to the open position 44 from the closed position 42, and to the closed position 42 from the open position 44. The finger tab 48 is generally configured to allow the user to operate the flange 40 and at the same time maintain clean hands. The flange 40 includes a male engagement tab 46, optionally centrally disposed on the flange 40 and configured to align with and engage a female engagement tab 28 located optionally on the interior 30 of the sidewall 22 when the flange 40 is in the closed position 42. It will be noted that the male engagement tab 46 could be positioned on the sidewall 22 and the female engagement tab 28 could be disposed on the flange 40. The engagement tabs 28 and 46 can be integrally formed with the basin 20 and the flange 40 and may be interference clips or any other type of snap closure. The engagement tabs 28 and 46 are configured to secure the flange 40 in a closed position 42. Optionally, the engagement of the tabs can emit an audible click or other noise to inform the user that the securing flange is indeed secure, and configured to hole the sieves and/or liner in a desired position.

With reference to FIG. 3A, the male engagement tab can include a tab base 46B and an end finger 46F generally disposed transverse to the base. The female engagement tab 28 can include a rounded or angled ramp 28R that transitions to a ledge 28L. When the flange 40 is closed, the base 46B and or finger 46F can resiliently move, bend or deform upon engagement with the ramp 28R until the end finger 46F clears the ledge 28L. Upon this clearing, the tensioned base moves the finger into the recess 28K adjacent the ramp, as shown in broken lines. Upon this movement, the finger or base may engage the ledge and audibly click or snap, indicating to a user that the flange is secure. This lock element thereby holds the securing flanges tight against the sieves and/or liner, sandwiching them between it and the interior of the basin or sidewall. Of course, a variety of other lock elements can be substituted for that above, depending on the application.

The securing flanges 40 can be configured to securely hold in place at least one liner and one or more litter sieves 70 at any one time. The securing flanges 40 can be further configured to reduce or eliminate the exit of litter from the basin 20 during an animal's covering of waste. Additionally, the securing flanges 40 are configured to be opened 44 or closed 42 in any order without interference from another flange 40.

Figure 15:
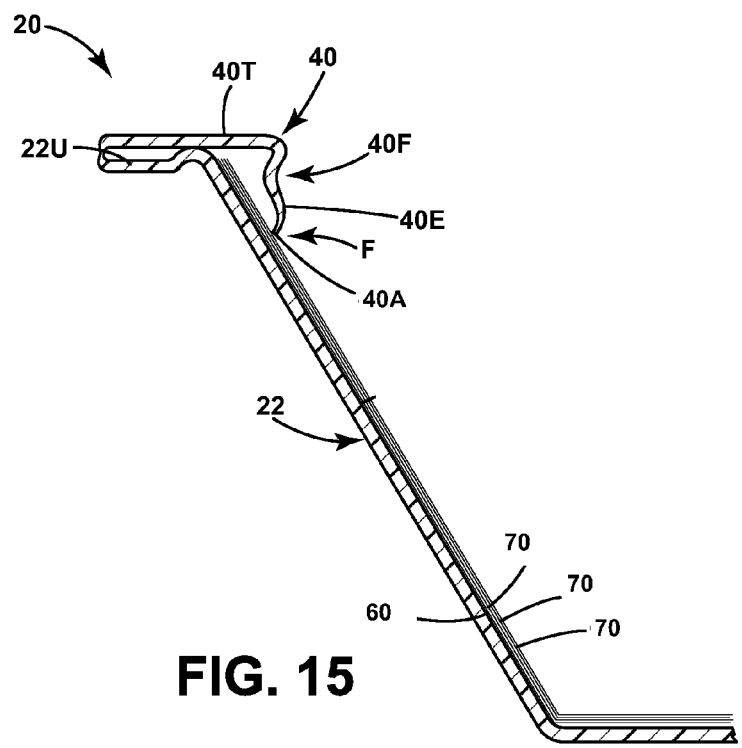
FIG. 15 is a section view of the basin and a securing flange, taken along lines 15-15 of FIG. 1 with many sieves disposed under an engagement flange.
Figure 16:
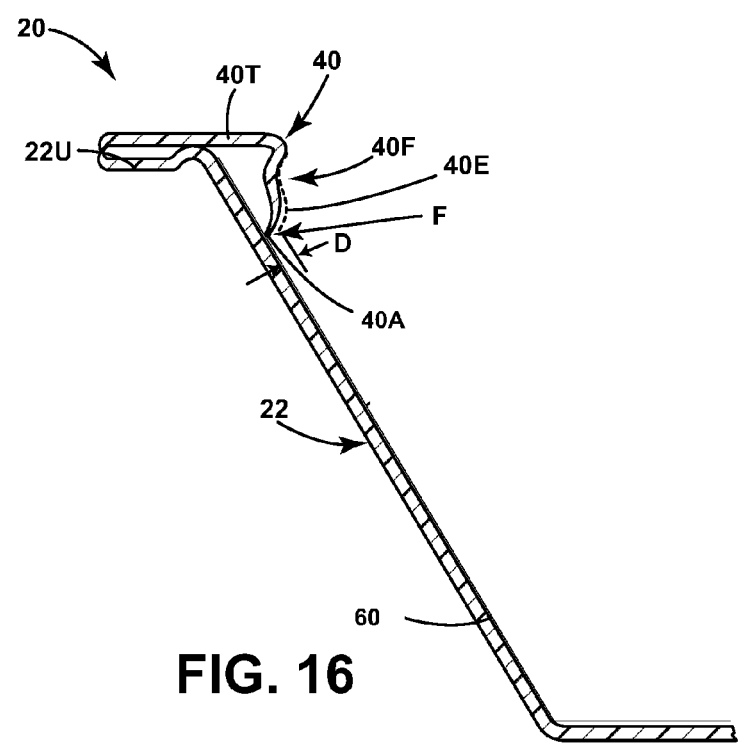
FIG. 16 is a section view of the basin and the securing flange, taken along lines 15-15 of FIG. 1 with fewer sieves disposed under the engagement flange.

In some embodiments, the securing flanges can include a flexing, resilient or moveable component to accommodate varying numbers of sieves disposed in the basin and secured by the securing flange. For example, with this component, the securing flange can secure both a large number of sieves (and a liner) between it and the basin sidewall, as well as a small number of sieves between it and the basin sidewall, where the large and small number of sieves provides different overall thicknesses. With reference to FIGS. 15 and 16, the securing flanges 40 can include an upper or top plate 40T. This generally forms the uppermost part of the securing flange when in the closed position. The top plate 40T also is disposed immediately adjacent the upper ledge 22U of the basin sidewalls when the securing flange is in the closed position. The top plate 40T transitions to a flexing region, line or point, collectively referred to as a flex element 40F along a face of the securing flange 40. The flex element 40F moveably, resiliently and/or flexibly couples an engagement flange 40E to the top plate 40T. The engagement flange 40E can include an engagement portion or tip 40A located optionally distal from the flex element 40F. The engagement tip 40A can be disposed at a first distance from the sidewall 22 when the liner and several sieves, for example 3-10, are disposed between the engagement tip and the sidewall. The engagement tip 40A also can be disposed at a second distance from the sidewall 22 when the liner only and/or a few sieves, for example 1-5, are disposed between the engagement tip and the sidewall. The second distance can be less than the first distance.

Optionally, the engagement flange 40E can be rounded or angled. This can enable or assist the engagement flange in flexing outwardly when the flange or tip engages a large number of sieves, or thicker sieves in general, for example, as shown in FIG. 15.

Figure 8:
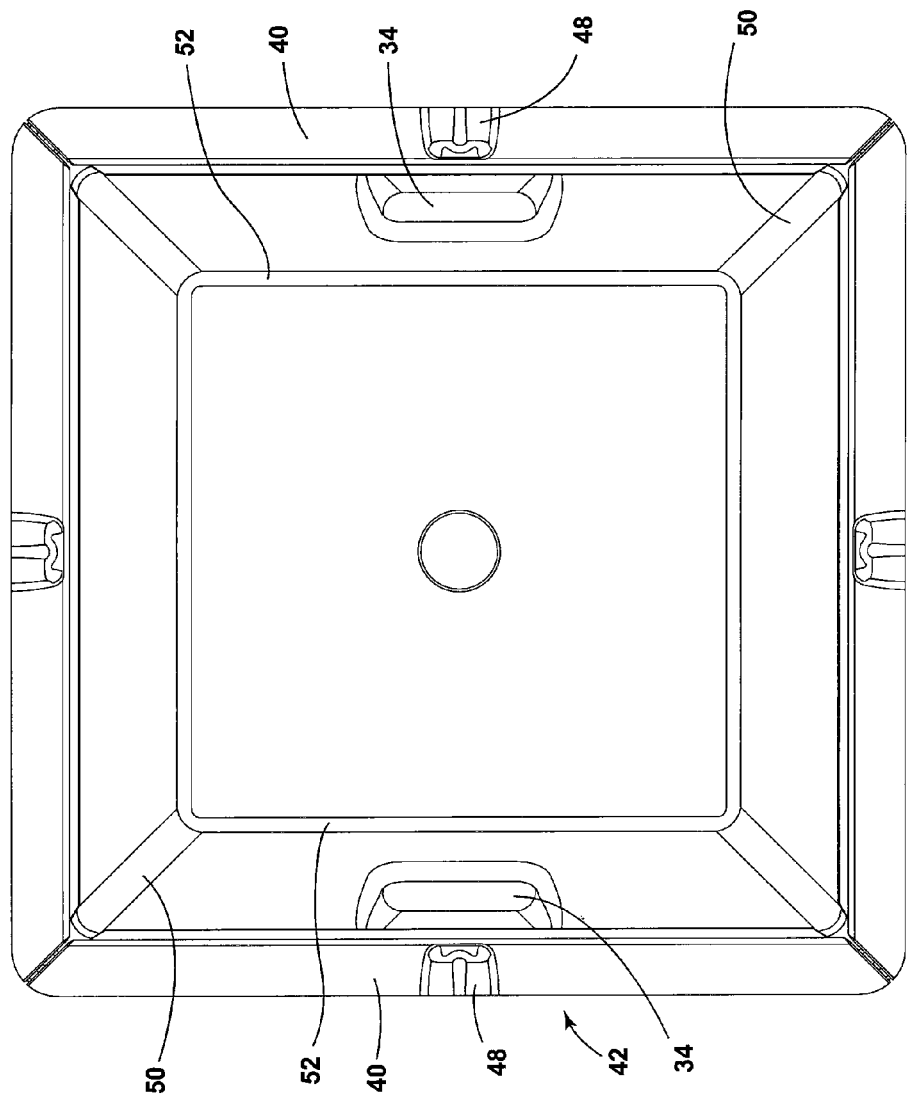
FIG. 8 is a top plan view of the basin.
Figure 9:
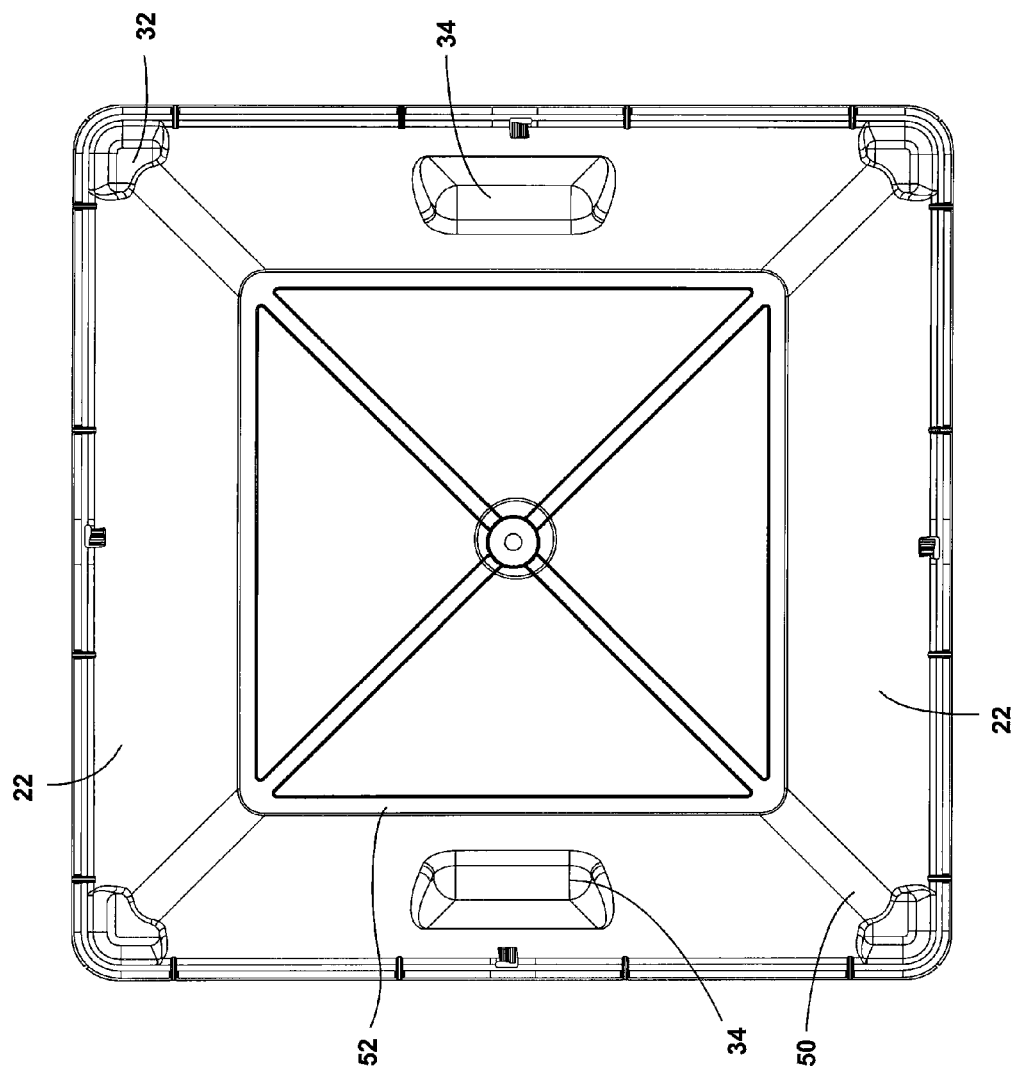
FIG. 9 is a bottom plan view of the basin.
Figure 10:
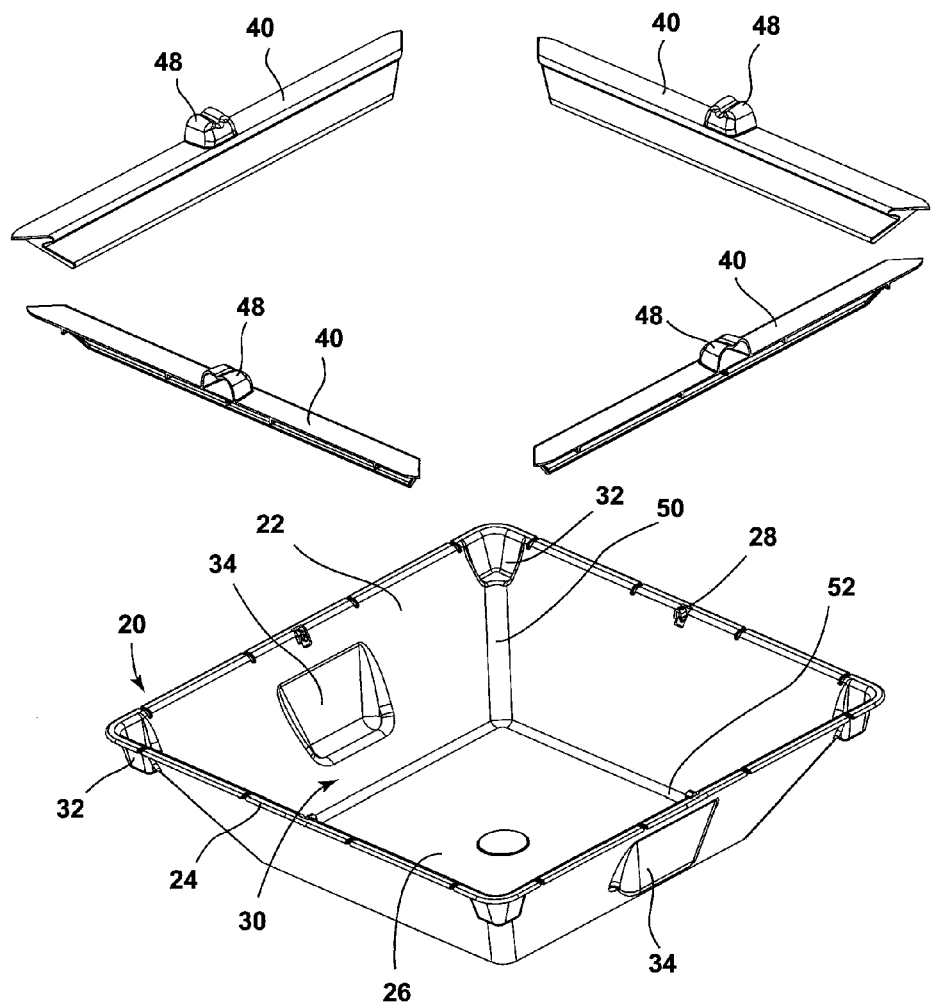
FIG. 10 is an exploded perspective view of the basin.

As shown in the embodiment illustrated in FIG. 8, and described above, the handles 34 of the basin 20 can be recessed on the interior of the basin 20 to provide safe and secure stacking of multiple basins 20. FIG. 9 shows the bottom of the basin 20 having a flat bottom surface and handle protrusions 34 on the sidewalls 22. FIG. 10 shows an exploded view of the basin 20 having the securing flanges 40 removed.

Figure 11:
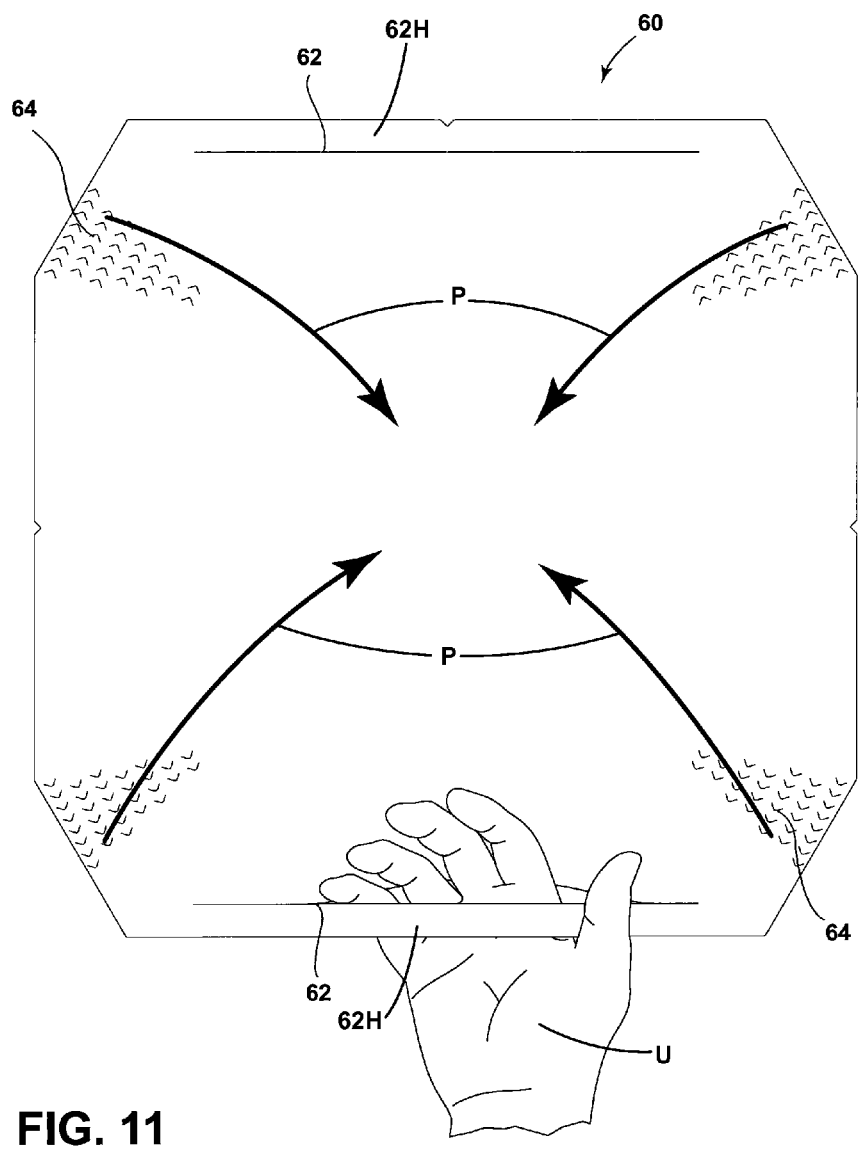
FIG. 11 is a top plan view of a liner of the current embodiment.

FIG. 11 shows the liner 60 of the waste disposal apparatus 10. The liner 60 can be generally square in shape having each corner of the square cut off to provide a generally eight sided shaped liner 60. Of course, other configurations, two and/or three dimensional, can be selected for the construction of the liner. For example, in some cases, the liner can be constructed so that if it was self-supporting it would be in the shape of a truncated, square pyramid, turned upside down and hollowed out.

Optionally, the liner 60 can be constructed from a polypropylene plastic material, however, a variety of different materials can be used, such as other polymers, Mylar, Tyvek® house wrap, mesh, and other films or sheet like materials. As shown in FIG. 11, the liner 60 can include a plurality of holes, optionally vacuum perforations, 64 disposed in each of the corners of the liner 60. The liner 60 can further include one or more handle slits 62 configured to allow a user to easily remove the liner 60 when desired, while keeping the hands of the user clean. As an example, a user may place their hands U through the opposing slits 62 to achieve a handled hold on the liner 60. In this manner, a user can then lift the liner from the basin, carrying with it the litter previously disposed in the basin. As the liner is lifted, the movement of the handles 62H upward, and the weight of litter and possibly waste on the liner pulling downward, causes the corners of the liner to move inward in direction P, generally toward the center of the liner, all while the liner folds and/or deforms upward and/or inward upon itself.

Optionally, the liner can be substantially free from openings, apertures or holes in the remainder of the liner so that litter material cannot be sifted or filtered using the liner. In this manner, the liner presents a final barrier between the litter/animal waste, and the bottom 2 and/or sidewalls of the basin. Accordingly, in many cases, the animal waste might not contact the interior of the basin, in which case, maintenance and cleaning of the basin can be facilitated.

Figure 14:
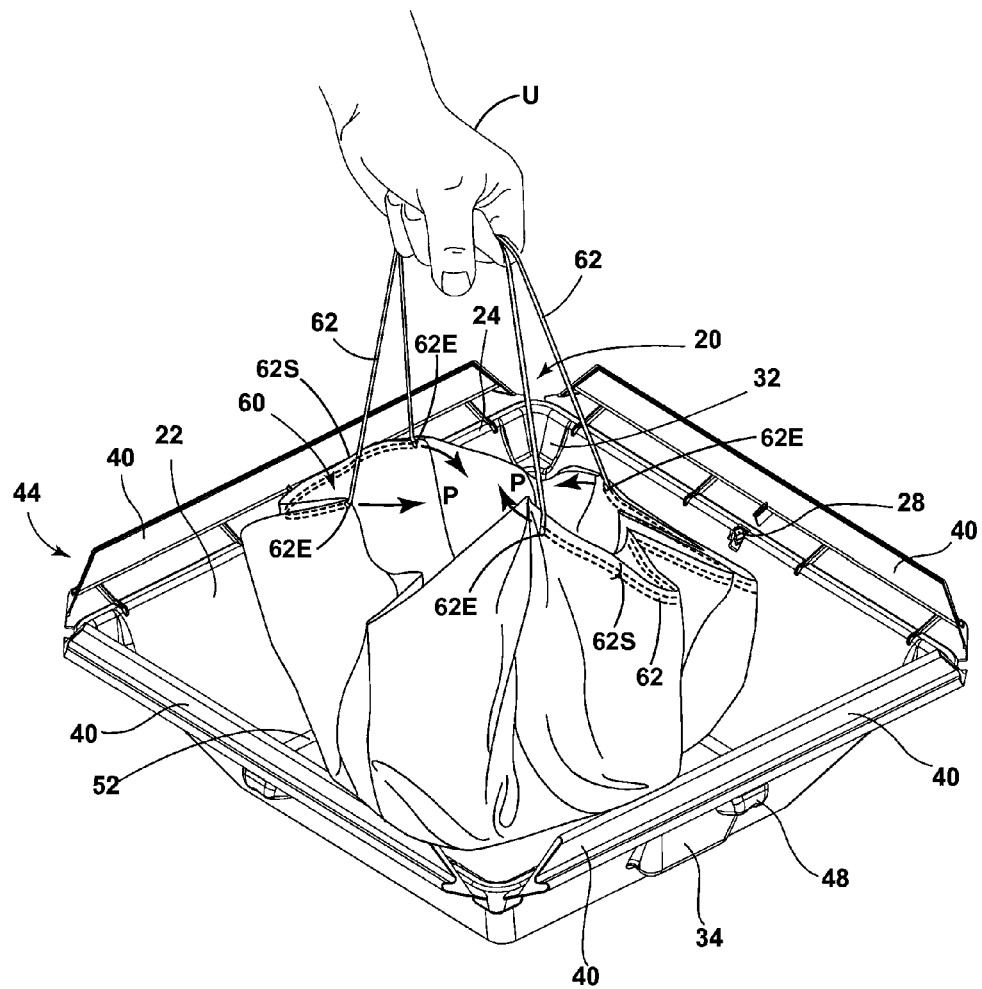
FIG. 14 is top perspective view of one embodiment of the waste disposal apparatus.

In an alternate embodiment, shown in FIG. 14, the handles 62 can be string handles extending from the liner 60. The string handles can be any type of handle constructed from string, rope, ribbon, cord, wire, or other elongate elements. The string handles can be configured so that they can be brought together, generally engaging one another, above the liner to lift the liner 60 from the basin 20. The string handles can be moveably and/or slidably disposed in sleeves 62S defined by the respective edges of the liner 60. The sleeves can be formed by folding the ends or edges of the liner over upon themselves, and securing this configuration with stitching, hot welding, fasteners or other constructions.

When the string handles are pulled upward by a user U as shown in FIG. 14, the string handles slide and/or move relative to the sleeves 62S within which they are disposed, with more and more of the string handles drawings out from the sleeves to expose more of the string handles. This action can bunch the liner between the points of engagement 62E (which are in the form of holes in the sleeves 62S) of the string handles with the liner. As a result, the liner outer edges converge on one another to mimic a parachute type configuration, with litter and waste in the liner drawing down on the liner (optionally near its center LC), and further cinching the string handles relative to the liner edges. Optionally, the above liner characteristics and components, such as the string handles, sleeves, points of engagement, center and the like can be similarly implemented in the sieves.

If desired, the corners can be removed from the liner 60. This can enable the liner 60 to be flush with the interior 30 of the basin 20 and not have extra liner 60 material gathered or bunched at the corners of the basin 20 so that those bunched liner parts remain uncaptured by the securing flange. The removed corners can further provide the parachuting action of the liner 60 when it is removed from the basin 20 by the handle 62. The parachuting action can enable the waste and used litter to maintain a position inside the liner 60 and can facilitate easy clean up and disposal.

Figure 12:
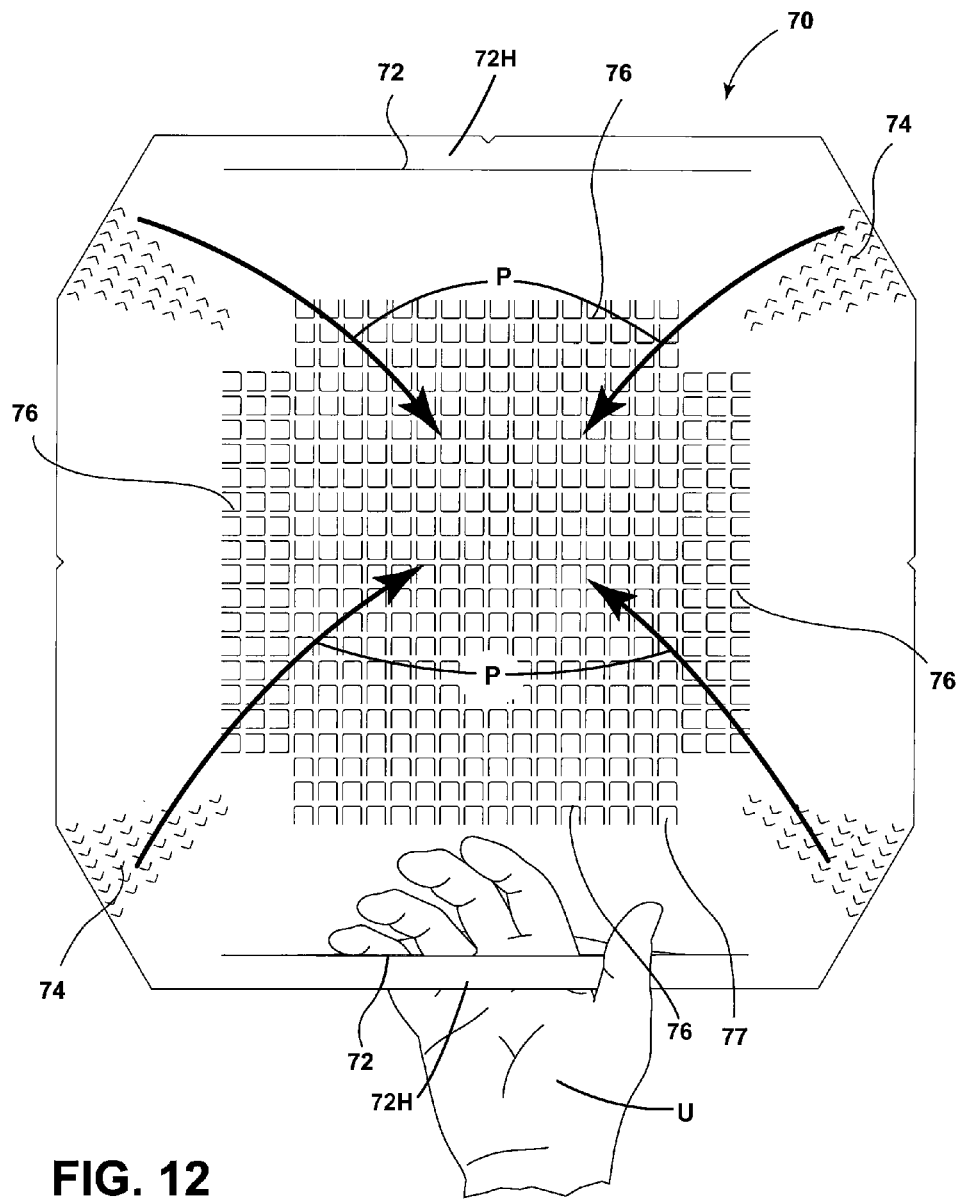
FIG. 12 is a top plan view of a litter sieve of the current embodiment.

FIG. 12 shows the litter sieve 70 of the waste disposal apparatus 10. The litter sieve 70 is generally comprised of a polypropylene material, however, a variety of different materials can be used, such as other polymers, Mylar, Tyvek® house wrap, mesh, and other films or sheet like materials. Similar to the liner 60, the sieve 70 can be configured in a generally square configuration with each of its four corners cut out or removed to provide an eight sided sieve 70. Of course, other configurations, two and/or three dimensional, can be selected for the construction of the sieves. For example, in some cases, the sieves can be constructed so that if they were self-supporting they would be in the shape of a truncated, square pyramid, turned upside down and hollowed out.

The litter sieve 70 can further includes handle slits 72 defined on opposing sides of the litter sieve 70, similar to the handles of the liners described above. Optionally, in an alternate embodiment, the handles 72 may be string-like handles extending from the sieve 70 and are configured to be brought together by a user to lift at least one sieve 70 from the basin 20. Moreover, the handles 72 are configured to be hidden behind the liner 60 when not in use. Again, during removal the litter sieve 70 is configured to form a parachute like structure allowing the waste and used litter to stay inside of the parachuted litter sieve 70 during removal and disposal of the sieve 70. As a sieve is lifted individually, the movement of the handles 72H upward, and the weight of litter and possibly waste on the sieve pulling downward as the litter sifts through the holes 76, causes the corners of the sieve to move inward in direction P, generally toward the center of the sieve, all while the sieve folds and/or deforms upward and in upon itself.

The litter sieve 70 further includes a plurality of holes 76. In the embodiment shown in FIG. 12, each hole 76 is generally cut on three sides to form a rectangular flap 77. The cuts are made in different directions based on the location of the hole 76, and are configured to allow the maximum amount of clean litter through the flap while maintaining any waste on the surface of the sieve 70. The flaps 77 are configured to open with the pressure of clean litter disposed on top of the sieve 70. The holes 76 are specifically designed such that during the sifting process the maximum amount of clean litter falls through the sieve 70 to be used again during operation of the waste disposal apparatus 10. The holes 76 are generally arranged in a plus sign configuration having each of the flaps generally facing towards the center of the sieve 70. When litter is disposed on top of the sieve 70, the hole flaps 76 are closed and none of the holes 76 are visible above the litter line. Additionally, the sieve 70 can include a plurality of vacuum perforations 74 disposed in each corner corresponding to the vacuum perforations 64 of the liner 60. Optionally, other shapes can be used to form the holes 76. For example, the holes 76 can be completely open, without any flaps or the like. In such cases, different aesthetic shapes can be used for the holes, such as circular, elliptical, rounded, polygonal, triangular, trapezoidal, and combinations of the foregoing.

In operation, the waste disposal apparatus 10 is configured to allow the user to keep clean hands during set up of the apparatus 10 and disposal of pet waste. The basin 20 is configured to start with its securing flanges 40 in the open position 44. Next, at least one liner 60 is disposed centrally on the basin 20. A plurality of litter sieves 70 are disposed on top of the liner 60. The litter sieves can be layered one upon the other, and upon the liner as well. The securing flanges 40 are moved to the closed position 42 in order to secure the liner 60 and the litter sieves 70 in place in the basin 20. As the securing flanges move to the closed position, the male 46 and female 28 engagement tabs can engage one another, and as described above can audibly clip or snap to inform the used that the securing flange is locked in position. Optionally, as illustrated in FIG. 15, the engagement flange 40E can move so that the flange flexes or moves about the flex element 40F, clamping or sandwiching the liner and sieves between the flange and the interior of the sidewall 22. This, in turn, supports the upwardly extending portions of the liner and sieves so that they do not slide down the sidewalls of the basin.

With the liner and sieves installed in the basin and generally secured, clean litter can be added to the basin 20, completely covering all of the holes 76. The litter also generally covers the parts of the topmost sieve extending up the sidewalls up to the securing flanges. When it is time for the waste disposal apparatus 10 to be cleaned and waste removed, a user engages the securing flanges 40, and generally the finger tabs 48. The user pushes the flanges back into the open position 44 (FIG. 3) using the finger tabs 48, all while the securing flanges rotate or move about a respective hinge or other element. Upon initial movement, the male and female engagement tabs also disengage from one another, thereby "unlocking" the securing flange so that it can move to the open position.

To remove a sieve, the user engages the handles 72 of at least one litter sieve 70. The user than sifts out clean litter through the three sided flaps 77 which open under the weight of the animal waste and unused litter passes the flaps 77 and falls through the holes 76 onto the next sieve 70 still located within the basin 20. The animal waste remains in the sieve. Where the flaps are absent, and the holes 76 are simply open in other embodiments, the unused litter sifts through those holes, and the animal waste remains in the sieve.

After the animal waste is sieved, the handles 72 of the sieve 70 are joined together forcing the litter sieve 70 into a parachute-like configuration which allows the animal waste to stay safely inside of the sieve 70 and to not come in contact with a user. The litter sieve 70 is then disposed of, for example in a composter or in a suitable waste collection device. This process can then be repeated until all of the sieves 70 are used. Additional sieves 70 can be added when desired by a user.

Another embodiment of the sieves for use with the current embodiments or alone is shown in FIGS. 17-23 and generally designated 80. The construction, functionality and operation of this sieve can be implemented in a liner. Generally, in such a construction, the liner can differ from the sieves described below in that the base or bottom wall of the liner might not include holes, apertures or other perforations that allow material to drain or sift through the base or bottom wall. All the other components can be the same and therefore the construction of such a liner will not be described again here.

Turning to FIGS. 17 and 17A-17B, the litter sieve 80 can include a base 80B which generally forms the bottom thereof. To the base 80B, multiple sidewalls 80S1, 80S2, 80S3 and 80S4 can be joined. Generally, the sidewalls can extend upwardly and away from the base, particularly when the sieve 80 is disposed in a basin and the sidewalls of the basin support the respective sidewalls of the sieve. Although shown as including only four sidewalls, additional sidewalls can be added, or some sidewalls can be deleted. Further, the sieve can include on continuous sidewall. As shown, the sidewalls can be joined at corners 80C. Optionally, the sidewalls can be longer or of a larger dimension at their tops. For example, top 80S4T can be longer than the bottoms 80S4B. In this manner, the sidewalls can generally form trapezoidal or non-rectangular shapes.

At their ends, each sidewall can be joined with adjacent sidewalls via the corners 80C. Optionally, the sieve 80 can be constructed as a flat two-dimensional planar sheet with completely open holes 80H formed therein. Triangular shapes can be removed from each of the corners of the flat planar sheet. The remaining ends of the sidewalls can be tacked, sealed or otherwise joined with one another to form a three dimensional shape, optionally in the form of a truncated upside down pyramid. Alternatively, the sidewalls 80S1, 80S2, 80S3, 80S4 can be integrally formed with one another and the bottom 80B in a mold that is in the final desired three dimensional shape of the sieve, which mimics the interior of a basin within which the sieve is disposed in use.

This sieve 80 can be constructed from the same materials as the sieve and/or liner mentioned above. The configuration of the holes 80H in the base 80B can be of a plus (+) shape. Optionally, the holes 80H are defined substantially only in the bottom or base 80B, without extending up into or being defined by the respective sidewalls of the sieve 80.

One or more of the sidewalls can include one or more envelopes within which one or more handle ribbons are disposed. For example, as shown in FIG. 17, the first sidewall 80S1 and the second opposing sidewall 80S2 can define first and second envelopes 80E1 and 80E2, respectively. These envelopes can generally be similar or identical in structure, along with the handle ribbons disposed in them. Further, although shown as being disposed only on opposing sides 80S1 and 80S2, the envelopes 80E1 and 80E2 can be continuous, for example, additional envelopes can be formed in sidewalls 80S3 and 80S4 so that the first and second handle ribbons are connected to one another and form a continuous loop extending around the entire sieve.

With reference to FIGS. 17, 17A, the envelopes and handle ribbons will now be described in more detail. It should be noted that the second envelope 80E2 and second ribbon 82 can be identical to that of the first envelope 80E1 and first ribbon 81. Thus, the second envelope and second ribbon will not be described again here. To begin, the first envelope 80E1 can be disposed at an uppermost portion of the sieve 80. Optionally, the envelope 80E1 can be disposed so that it faces and forms at least a portion of an outside lateral edge 80L of the respective sidewall. The envelope 80E1 can form an interior cavity 80U as shown in FIG. 17A. This interior cavity can be formed by a top panel 80T that is adjacent and/or disposed a preselected distance from a bottom panel 80B. The top panel 80T and 80B can be separate components or they can be integrally formed. For example, the top panel 80T can be continuous with the bottom panel 80B with the bottom panel simply being folded back against the sidewall 80S1 and/or top panel and secured directly to the sidewall 80S1 and/or top panel. This may be achieved via tack welding, heat welding, gluing or otherwise securing the bottom panel 80B to the top panel 80T and/or sidewall 80S1. The top panel 80T and bottom panel 80B each include interior surfaces that generally face toward and form the first interior cavity 80C1. This first interior cavity 80C1 can run the entire length of the sidewall 80S1 along the lateral edge 80L.

Figure 18:
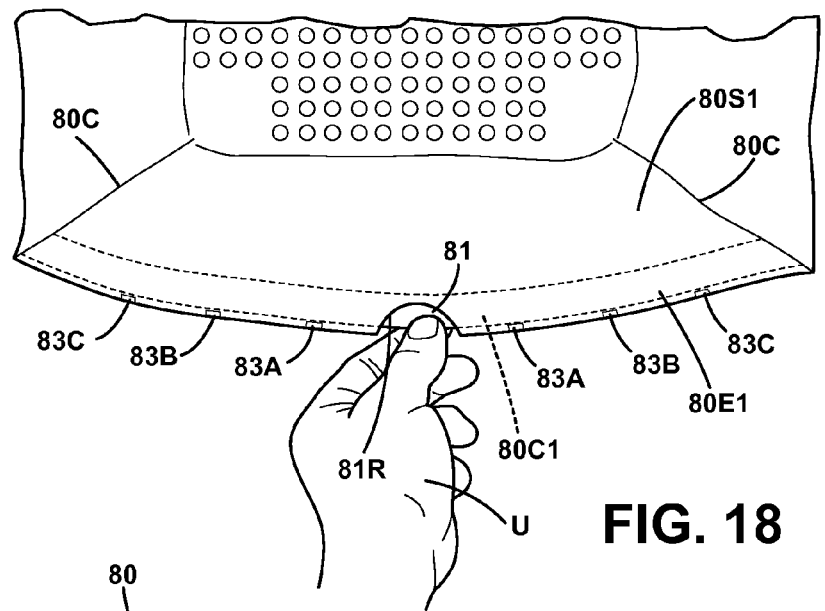
FIG. 18 is a top view of the handle ribbon of the alternative sieve being initially engaged by a user, before any frangible elements of the sieve are broken.

As shown in FIGS. 17 and 18, the interior cavity 80C1 and the envelope in general 80E1 can be open with the envelope 80E1 forming an access recess 81R. This access recess can be utilized so that a user U can grasp and access the first handle ribbon 81 disposed within the envelope 80E1 and generally within the interior cavity 80C1. The recess 81R can be in the form of a rounded opening so that a user can grasp the upper and lower surfaces of the handle ribbon 81, pinch it and pull it through the recess 81R, generally so that the handle ribbon 81 exits and/or is removed from at least a portion of the envelope 80E1 and the interior cavity 80C1 as described in further detail below.

With reference to FIGS. 17A-17B, the first and second envelopes can include one or more frangible elements 83. These frangible elements 83 can be disposed along the outer lateral edge 80L and can form a portion of the closure of the respective envelopes 80E1 and 80E2. The frangible elements generally can be configured so that they fail, break, or otherwise become partially destroyed upon the application of a preselected force to the respective handle ribbon and/or the respective envelope. As an example, when a user exerts a preselected force, above about 2 lbs. to the handle ribbon, thereby pulling it through the access recess 81R, 82R, the frangible elements can break, snap or otherwise fail to allow more of the respective handle ribbon to be pulled from and removed from the respective envelope and/or interior cavity.

A variety of different frangible elements can be used to facilitate this function. For example, as shown in FIG. 17B, the outermost lateral edge 80L of the envelope 80E2 can be perforated with multiple apertures 85. Between the apertures, the remaining portion of the panels that join with one another can form the frangible elements 84A and 84B. A first frangible element 84A can be adjacent the access recess 82R. A second frangible element 84B can be separated from the first frangible element 84A by a perforation 85. Subsequent frangible elements connecting the respective top and bottom panels of the envelope 80E2 can form third and fourth frangible elements and so on. The number of frangible elements can be selected depending on the breaking force desired to pull the handle ribbon at least out partially from the envelope and/or the interior cavity of the respective sieve. Other factors, such as strength of the handle ribbon, its attachment to the remainder of the sieve, and similar items can be considered for the design of the frangible elements.

FIGS. 17A and 17C illustrate another construction for the frangible elements. There, other frangible elements include heat welded portions 84A', 84B' that secure the top and bottom panels of the envelope 80E2' together. These heat welded portions between the panels can be formed by partially melting the material from which the panels are constructed so that they bond to one another in a fused or melted region. The welds can be configured to fail upon the application of a predetermined tension or force to the respective handle ribbon. In which case, upon failure or breakage, the frangible elements enable at least a portion of the handle ribbon to exit from the envelope and the respective interior cavity. The holding strength of the heat welds can vary depending on their size, the heat applied, the material used to construct the sieve and other factors. In other embodiments, the heat welds 80A' and 80B' can be substituted with drops of glue, cement, adhesives or fasteners located between the respective panels of the respective envelopes. Particular adhesives can be formulated to fail and/or allow the respective panels of the envelope to break away upon application of a preselected force to the handle ribbon.

As shown in FIGS. 17 and 17A, the first and second handle ribbons 81 and 82 can be generally elongate strips of material. As shown, they can be constructed from flat sheets of material such as a polymer plastic or other polymer. As used herein, handle ribbons can also be in the form of, and can refer to strings, chords, ropes, wire, or other elongate elements constructed from a variety of materials. The handle ribbon as illustrated is in a flat form and of a miniscule thickness. This, of course, can be changed depending on the particular application and amount of animal waste expected to be removed using the sieve and/or liner of a similar construction.

Each of the first and second handle ribbons 81 and 82 can be configured and disposed within the envelopes 80E1 and 80E2 so that at least half the length of the handle ribbon is disposed between the top 80T and bottom 80B panels of the respective envelopes. In some cases, at least two thirds or three quarters of the entire length of the handle ribbons can be disposed within the respective envelopes and concealed substantially there within. The portion of the handle ribbon 81 adjacent the access recess 81R and 82R can be exposed and unconcealed by the envelope. This can enable the user to grasp the handle ribbon in that location and pull it to at least partially destroy the envelope and remove the handle ribbon therefrom.

The handle ribbon shown in FIG. 22A can include a first end 81A and a second end 81B. Generally, these first and second ends of the first handle ribbon 81 can be disposed on opposite sides of the sieve 80, close to the respective corners 80C of the sieve. The end 81A and 81B, ends can be permanently secured to the sieve envelope, and in particular the top panel 80T and/or bottom panel 80B. As shown, in FIG. 22A, the end 81A can be heat welded with heat welds 80H to the top panel 80T and the bottom panel 80B. This again can provide a secure and relatively permanent attachment of the handle to the sieve, even when the remainder of the ribbon is pulled out from the envelope 80E1 as shown in FIG. 22. Optionally, the ends can be attached to the interior of the envelope generally within the first 81CE and second 81CE' opposite ends of the first interior cavity.

Further optionally, opposite the ends 81A and 81B cannot be removed from the envelope and/or respective panels of the sieve without destroying one or both. The strength with which the handle ribbon is attached to the sieve at its first and second ends can depend on the intended use of the sieve. For example, where the sieve will be used to lift a significant amount of litter in a large basin, the points of attachment of the handle ribbon ends to the envelope and/or sieve can be significant. Where the sieve will be used with a relatively smaller basin and a small amount of litter, less securement of the ends of the handle ribbon to the envelope can be utilized. Although the handle ribbon ends are shown as being connected with heat welds 80H, the ribbon 81 can also be attached at its ends to the envelope and/or sieve using cement, adhesives, or even fasteners such as rivets, tacks, staples, studs or other types of fasteners.

Operation of the sieve 80 will now be explained with reference to FIGS. 18-23. As shown in FIG. 18, the sieve 80 can be initially engaged by a user U. This can be performed when the litter (not shown) is ready for sifting to remove animal waste through the sieve. The user U engages the ribbons 81 and 82 exposed through the respective access recesses 81R and 82R. At this point, the ribbon is substantially disposed within the respective envelope 80E1. The frangible elements 83A, 83B and 83C are generally all intact and unbroken. Optionally, the frangible elements 83A, 83B and 83C can be positioned in series. The first elements can break first, the second elements can break second and the third frangible elements can break after that. Additional frangible elements can break subsequent to the same. The above configuration of the handle ribbon being in the envelope generally prevents that ribbon from tangling with the ribbons of other sieves and/or liners placed adjacent it. For example, when multiple sieves are stacked upon one another or a liner, their corresponding ribbons do not become tangled to inhibit separation, movement or other manipulation of the sieves and/or liner.

Figure 19:
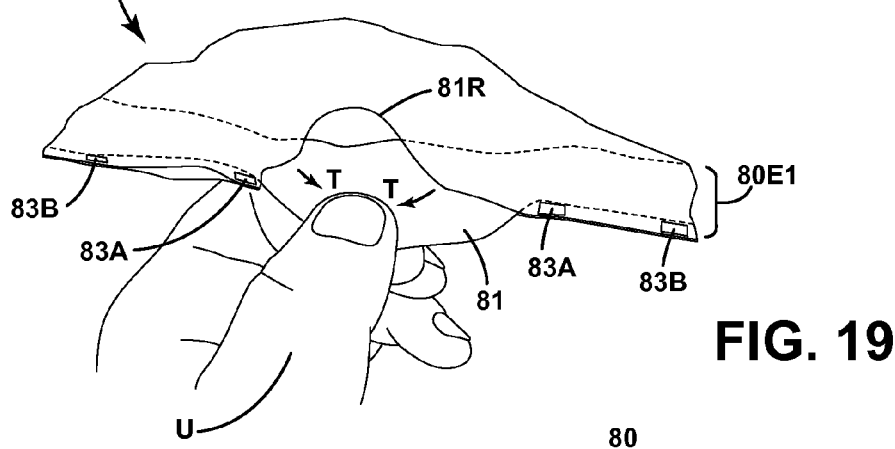
FIG. 19 is a close up view of the handle ribbon as first frangible elements of the sieve are being stressed under a force of pull by the user.

Continuing at FIG. 19, the user U exerts a force T which generally can be in the form of a tension placed on the first ribbon 81. As the tension increases, it opposes the weight of litter and animal waste disposed within the sieve. The tension also begins to increase the forces exerted upon the first frangible elements 83A because the ribbon engages those elements.

Figure 20:
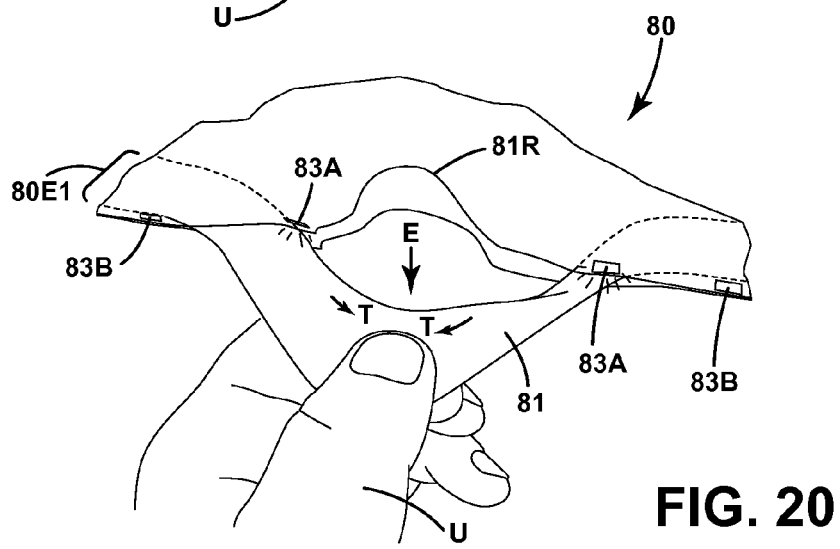
FIG. 20 is a close up view of the handle ribbon as first frangible elements of the sieve are stressed to failure and breaking to release a part of the handle ribbon from the envelope under the force of pull by the user, with second frangible elements of the sieve subsequently being stressed under a force of pull by the user.

The user U continues to exert tension T on the ribbon 81 at a predetermined force of optionally at least 0.5 lbs., 1 lb., 2 lbs., 3 lbs., 4 lbs., 5 lbs., 10 lbs., 15 lbs., 20 lbs. or more depending on the application. Eventually, the first frangible elements 83A break or fail. Upon the breakage or failure, these elements can pop or snap—or can emit no audible sound. When the frangible elements break, they enable an additional portion of the ribbon 81 to exit the portion of the envelope 80E1 adjacent the frangible elements 83A. Thus, more of the ribbon becomes exposed and exits the envelope in the direction E as illustrated in FIG. 20.

As shown in FIG. 21, the handle ribbon 81 is withdrawn even farther from the envelope 80E1. In this part of the extraction of the ribbon 81 from the envelope 80E1, the second frangible elements 83B snap or break to enable even more of the ribbon 81 to exit the envelope in direction E.

As shown in FIG. 22, the ribbon 81 is substantially removed from the envelope 80E1. The frangible elements associated with the envelope 80E1 are all broken or have failed to extract a substantial portion, for example, at least one half and up to three quarters or more of the length of the ribbon 81 from the envelope 80E1. The ends 81A and 81B of the envelope 80E1 however remain securely attached to the remainder of the sieve so that the handle ribbons 81 can act as handles to pull up and lift the sieve when it is filled with litter and/or animal waste.

Figure 23:
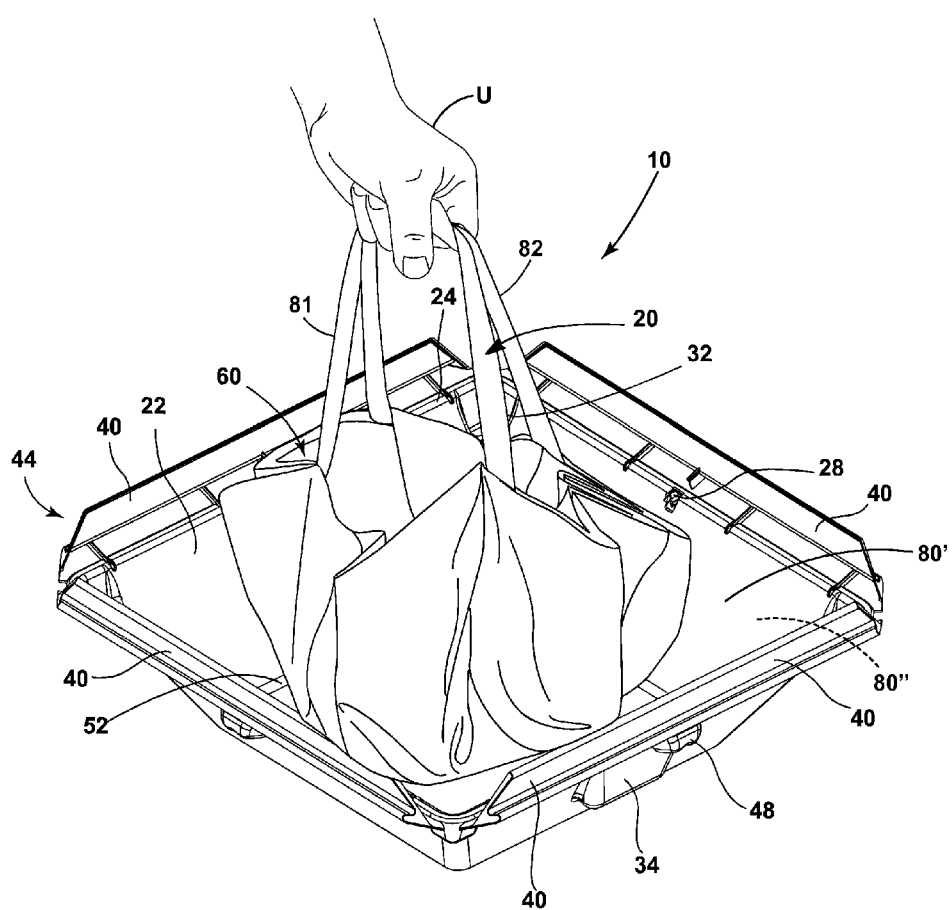
FIG. 23 is a perspective view of the sieve after all the frangible elements of the sieve are broken and the handle ribbons on opposing sides of the sieve are being used to pull up the sieve from the basin, thereby sifting the litter from the sieve and retaining associated animal waste.

In FIG. 23, the lifting action of the and operation of the sieve 80 is illustrated. There, the sieve 80 is filled with litter and animal waste that drains through the holes defined by the bottom of the sieve. The handle ribbons 81 and 82 have been substantially extracted from and removed from the respective envelopes at the opposing ends of the sieve. The handle ribbons 81 and 82 can be joined near one another and optionally tied by the user U. After the litter material is sifted through the openings the sieve can be removed with the animal waste within it.

The unused litter material, of course, drains and rests upon the next adjacent sieve 80'. This next adjacent sieve 80' can include the same features, components and can function the same way as the previous sieve 80. Only after sufficient animal waste and litter has been deposited, is the sieve 80' engaged at the ribbon handles to remove the same. This operation of pulling and filtering animal waste from unused litter can be repeated multiple times depending on the number of additional sieves 80', 80", etc., associated with the animal waste disposal system.

Optionally, the sieves of the embodiments described herein can be provided in packets along with one or more liners. The multiple sieves can be stacked one upon the other with their handle ribbons aligned. Generally, the sieves and liner are flexible enough to be folded over upon one another to reduce the overall footprint of the packet. With the handle ribbons of the current embodiment being temporarily disposed and/or secured within the envelopes, the stacking and handling can be facilitated because these handle ribbons do not tangle or cause issues.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The embodiments of the invention in which an exclusive property or privilege is claimed are defined as follows:

1. A waste disposal apparatus comprising:
    four outwardly-canted sidewalls and a base wall forming a basin;
    at least one liner centrally disposed on an interior of the basin;
    a plurality of litter sieves centrally arranged adjacent the at least one liner; and
    securing flanges, each securing flange adjacent a top portion of one of the sidewalls, the securing flanges being operable between a closed position and an open position and each including at least one securing flange finger tab, wherein the plurality of litter sieves and the at least one liner are held securely in place by the securing flanges when the securing flanges are in the closed position, wherein at least one of the sidewalls includes a sidewall handle protrusion, wherein each securing flange is hingedly joined with the top portion of the respective sidewall, wherein the finger tabs are substantially centered between distal ends of the securing flanges and configured to assist a user in pivoting the securing flanges between the open and closed positions.

2. The apparatus of claim 1, wherein each of the sidewalls includes a female receiving member.

3. The apparatus of claim 2, wherein each of the securing flanges includes a male engagement tab.

4. The apparatus of claim 3, wherein when the securing flanges are in the closed position, the male engagement tabs engage the female receiving members so as to secure the securing flanges in the closed position.

5. The apparatus of claim 1,
wherein the securing flanges each include a top plate joined with an engagement flange,
wherein the engagement flanges directly engage one of the plurality of sieves,
wherein the engagement flanges move relative to the top plate when the engagement flanges secure the plurality of sieves and at least one liner between the engagement flanges and the respective sidewalls.

6. The apparatus of claim 1, wherein each securing flange includes a flex element adapted to enable an engagement flange to flex and move when the engagement flange engages at least one of the plurality of sieves.

7. The waste disposal apparatus of claim 1 wherein each sidewall includes an upper ledge and each securing flange is joined to the respective upper ledge adjacent an outer perimeter of the upper ledge such that the securing flange pivots outward, away from the interior of the basin.

8. The waste disposal apparatus of claim 7 wherein the plurality of litter sieves are disposed adjacent the sidewalls and are arranged such that the plurality of litter sieves do not extend onto the upper ledge of the sidewalls.

9. A waste disposal apparatus comprising:
four outwardly-canted sidewalls and a base wall forming a basin having an interior;
at least one liner centrally disposed on the interior;
a plurality of litter sieves centrally arranged on the at least one liner; and
securing flanges, each securing flange adjacent a top portion of one of the sidewalls, the securing flanges being operable between a closed position and an open position, each securing flange including a finger tab substantially centered between distal ends of the securing flange and configured to assist a user in pivoting the securing flange between the open and closed positions,
wherein the plurality of litter sieves and the at least one liner are held securely in place by the securing flanges when the securing flanges are in the closed position,
wherein each of the plurality of litter sieves include a plurality of pass-through holes,
wherein the securing flanges are hingedly joined with the top portion of respective sidewalls and each includes a flex element that selectively flexes to enable the securing flange to close to the closed position regardless of whether the at least one liner only is disposed in the basin, or whether the at least one liner plus the plurality of litter sieves are disposed in the basin,
wherein each securing flange includes an engagement flange that engages and clamps the plurality of sieves between the engagement flange and the sidewalls to hold up the plurality of sieves along the sidewalls.

10. The apparatus of claim 9,
wherein the sidewalls include a female engagement tab,
wherein the securing flanges include a male engagement tab,
wherein when each securing flange is in the closed position, the male engagement tab is in engagement with the female engagement tab to secure the securing flange in the closed position.

11. The apparatus of claim 9,
wherein each securing flange includes a top plate,
wherein each finger tab defines an opening sized to accommodate at least two human fingers, the finger tab projecting upwardly from the top plate,
wherein the securing flange is hingedly secured to an upper ledge of the respective sidewall.

12. The apparatus of claim 9,
wherein the engagement flange includes an engagement tip that engages at least one of the plurality of sieves and the at least one liner,
wherein the engagement tip is disposed at a first distance from the sidewall when the at least one liner and the plurality of sieves are disposed between the engagement tip and the sidewall,
wherein the engagement tip is disposed at a second distance from the sidewall when only the at least one liner is disposed between the engagement tip and the sidewall,
wherein the second distance is less than the first distance.

13. The waste disposal apparatus of claim 9 wherein each of the sidewalls includes an upper ledge and each securing flange is joined to the respective upper ledge adjacent an outer perimeter of the upper ledge such that the securing flange pivots outward, away from the interior of the basin.

14. The waste disposal apparatus of claim 13 wherein the plurality of litter sieves are disposed adjacent the sidewalls and are arranged such that the plurality of litter sieves do not extend onto the upper ledge of the sidewalls.

15. A waste disposal apparatus comprising:
four outwardly-canted sidewalls and a base wall forming a basin;
a liner removably disposed in an interior of the basin;
a plurality of litter sieves removably arranged adjacent the liner;
securing flanges, each securing flange hingedly joined with a top portion of one of the sidewalls, the securing flanges operable between a closed position and an open position, the securing flanges each including a finger tab substantially centered between distal ends of the securing flange and configured to assist a user in pivoting the securing flanges between the opened and closed positions; and
at least one pair of sidewall handle protrusions disposed on opposite ones of the sidewalls and configured to enable a user to lift the basin,
wherein the plurality of litter sieves and the liner are held securely in place by the securing flanges when the securing flanges are in the closed position.

16. The waste disposal apparatus of claim 15 including recessed corners disposed between adjacent ones of the sidewalls at an upper end of the sidewalls.

17. The waste disposal apparatus of claim 16 wherein the sidewall handle protrusions define recesses on the interior of the basin.

18. The waste disposal apparatus of claim 17 wherein the recessed corners and the handle recesses on the interior of the basin are configured to nest with one or more waste disposal apparatuses in a stacked configuration.

19. The waste disposal apparatus of claim 15 wherein each sidewall includes an upper ledge having an outer perimeter, wherein each securing flange is joined to the respective upper ledge adjacent the outer perimeter such that the securing flange pivots outward.

20. The waste disposal apparatus of claim 19 wherein the plurality of litter sieves are disposed adjacent the sidewalls and are arranged such that the plurality of litter sieves do not extend onto the upper ledge of the sidewalls.

* * * * *